(12) United States Patent
Wahlquist et al.

(10) Patent No.: US 10,675,578 B2
(45) Date of Patent: *Jun. 9, 2020

(54) PULSE JET AIR CLEANER SYSTEMS; EVACUATION VALVE ARRANGEMENTS; AIR CLEANER COMPONENTS; AND, METHODS

(71) Applicant: Donaldson Company, Inc., Minneapolis, MN (US)

(72) Inventors: Fred Wahlquist, Bloomington, MN (US); Thomas R. Olson, Prior Lake, MN (US); Jason R. DeGuelle, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/680,373

(22) Filed: Aug. 18, 2017

(65) Prior Publication Data

US 2017/0341000 A1 Nov. 30, 2017

Related U.S. Application Data

(63) Continuation of application No. 14/940,377, filed on Nov. 13, 2015, now Pat. No. 9,737,837, which is a continuation of application No. 13/010,068, filed on Jan. 20, 2011, now Pat. No. 9,186,612.

(60) Provisional application No. 61/297,522, filed on Jan. 22, 2010, provisional application No. 61/324,493, filed on Apr. 15, 2010.

(51) Int. Cl.
| | |
|---|---|
| *B01D 46/00* | (2006.01) |
| *B01D 46/48* | (2006.01) |
| *B01D 46/24* | (2006.01) |
| *F02M 35/08* | (2006.01) |

(52) U.S. Cl.
CPC ..... *B01D 46/0068* (2013.01); *B01D 46/0042* (2013.01); *B01D 46/0045* (2013.01); *B01D 46/0046* (2013.01); *B01D 46/2411* (2013.01); *B01D 46/48* (2013.01); *F02M 35/086* (2013.01)

(58) Field of Classification Search
CPC .... B01D 46/00; B01D 46/0068; F02M 35/08; F02M 35/086
USPC .................................. 95/19–22; 55/282–305
See application file for complete search history.

(56) References Cited

U.S. PATENT DOCUMENTS

| | | | |
|---|---|---|---|
| 1,751,982 | A | 3/1930 | Dunham |
| 2,044,221 | A | 6/1936 | Myers et al. |
| 2,853,153 | A | 9/1958 | Sexton |
| 2,864,394 | A | 12/1958 | Hempel |

(Continued)

FOREIGN PATENT DOCUMENTS

| | | |
|---|---|---|
| DE | 93 05 848 | 4/1993 |
| DE | 202 07 755 | 8/2002 |

(Continued)

OTHER PUBLICATIONS

Declaration of Randall A. Engelland and Charles D. Jensen (with Exhibits A-1-A-18) dated Jun. 29, 2012.

(Continued)

*Primary Examiner* — T. Bennett McKenzie
(74) *Attorney, Agent, or Firm* — Merchant & Gould P.C.

(57) ABSTRACT

Assemblies, features, and techniques for pulse jet air cleaner assemblies and their operation are described. Techniques described include methodology and equipment for preferred pulse jet sequencing and operation.

15 Claims, 20 Drawing Sheets

(56) References Cited

U.S. PATENT DOCUMENTS

| | | |
|---|---|---|
| 2,966,959 A | 1/1961 | Neumann |
| 3,383,841 A | 5/1968 | Olson et al. |
| 3,395,901 A | 8/1968 | Moser |
| 3,402,531 A | 9/1968 | Farr |
| 3,434,269 A | 3/1969 | Hyatt |
| 3,576,095 A | 4/1971 | Rivers |
| 3,593,503 A | 7/1971 | Andrews |
| 3,816,982 A | 6/1974 | Pierre |
| 3,838,065 A | 9/1974 | Lippert |
| 3,985,657 A | 10/1976 | Coffman |
| 4,204,846 A | 5/1980 | Brenholt |
| 4,214,882 A | 7/1980 | Brenholt |
| 4,247,315 A | 1/1981 | Neümann |
| 4,298,474 A | 11/1981 | Sillers, Jr. |
| 4,331,459 A | 5/1982 | Copley |
| 4,334,900 A | 6/1982 | Neumann |
| 4,359,330 A | 11/1982 | Copley |
| 4,364,251 A | 12/1982 | Nishihara et al. |
| 4,388,091 A | 6/1983 | Khosropour |
| 4,395,269 A | 7/1983 | Schuler |
| 4,433,986 A | 2/1984 | Borst |
| 4,452,616 A | 6/1984 | Gillingham et al. |
| 4,486,201 A | 12/1984 | Noguchi |
| 4,498,914 A | 2/1985 | Erickson |
| 4,504,293 A | 3/1985 | Gillingham et al. |
| 4,509,960 A | 4/1985 | Engel |
| 4,560,396 A | 12/1985 | O'Dell |
| RE32,185 E | 6/1986 | Copley |
| 4,600,415 A | 7/1986 | Barton |
| 4,622,995 A | 11/1986 | Gillingham |
| 4,650,506 A | 3/1987 | Barris et al. |
| 4,765,810 A | 8/1988 | Wetzel |
| 4,822,386 A | 4/1989 | Duchensneau |
| 4,826,512 A | 5/1989 | Fuller |
| 5,042,999 A | 8/1991 | Ernst et al. |
| 5,207,811 A | 5/1993 | Buonpastore |
| 5,223,011 A | 6/1993 | Hanni |
| 5,250,093 A | 10/1993 | Jiang et al. |
| 5,250,176 A | 10/1993 | Daniel |
| 5,281,246 A | 1/1994 | Ray et al. |
| 5,401,285 A | 3/1995 | Gillingham et al. |
| 5,512,074 A | 4/1996 | Hanni et al. |
| 5,545,241 A | 8/1996 | Vanderauwera et al. |
| 5,547,480 A | 8/1996 | Coulonvaux |
| 5,562,746 A | 10/1996 | Raether |
| 5,575,826 A | 11/1996 | Gillingham et al. |
| 5,616,171 A | 4/1997 | Barris et al. |
| 5,622,537 A | 4/1997 | Kahlbaugh et al. |
| 5,672,399 A | 9/1997 | Kahlbaugh et al. |
| 5,683,479 A | 11/1997 | Gillingham et al. |
| 5,693,109 A | 12/1997 | Coulonvaux et al. |
| 5,797,973 A | 8/1998 | Dudrey et al. |
| 5,814,133 A | 9/1998 | Hunter et al. |
| 5,897,676 A | 4/1999 | Engel et al. |
| D412,567 S | 8/1999 | Ward et al. |
| 6,051,042 A | 4/2000 | Coulonvaux |
| 6,096,199 A | 8/2000 | Covington |
| 6,129,852 A | 10/2000 | Elliott et al. |
| 6,334,887 B1 | 1/2002 | Coulonvaux |
| D455,826 S | 4/2002 | Gillingham et al. |
| 6,419,718 B1 | 7/2002 | Klug et al. |
| 6,485,538 B1 | 11/2002 | Toyoshima |
| 6,517,919 B1 | 2/2003 | Griffin |
| 6,602,308 B1 | 8/2003 | Carle et al. |
| 6,676,721 B1 | 1/2004 | Gillingham et al. |
| 6,872,237 B2 | 3/2005 | Gillingham et al. |
| 6,908,494 B2 | 6/2005 | Gillingham et al. |
| 7,070,642 B2 | 7/2006 | Scott et al. |
| 7,090,711 B2 | 8/2006 | Gillingham et al. |
| 7,517,393 B2 | 4/2009 | Richard |
| 7,524,349 B2 | 4/2009 | Schrage et al. |
| 7,537,631 B2 | 5/2009 | Scott et al. |
| 7,662,203 B2 | 2/2010 | Scott et al. |
| 7,927,396 B2 | 4/2011 | Olson et al. |
| 7,976,603 B2 | 7/2011 | Bauder et al. |
| 8,057,563 B2 | 11/2011 | Raether |
| 8,057,582 B2 | 11/2011 | Raether |
| 8,075,648 B2 | 12/2011 | Raether |
| 8,147,576 B2 | 4/2012 | Gillenberg et al. |
| 8,152,876 B2 | 4/2012 | Gillenberg et al. |
| 8,163,056 B2 | 4/2012 | Coulonvaux et al. |
| 8,262,762 B2 | 9/2012 | Olson et al. |
| 8,287,612 B2 | 10/2012 | Gillenberg et al. |
| 8,317,890 B2 | 11/2012 | Raether et al. |
| 8,394,166 B2 | 3/2013 | Scott et al. |
| 8,404,021 B2 | 3/2013 | Gillingham et al. |
| 8,444,748 B2 | 5/2013 | Gillingham et al. |
| 8,491,684 B2 | 7/2013 | Raether et al. |
| 8,545,585 B2 | 10/2013 | Raether |
| 8,951,321 B2 | 2/2015 | Gillingham et al. |
| 9,108,135 B2 | 8/2015 | Gillingham et al. |
| 9,186,612 B2 | 11/2015 | Wahlquist et al. |
| 2004/0055470 A1 | 3/2004 | Stauser et al. |
| 2004/0144253 A1 | 7/2004 | Gillingham |
| 2009/0308034 A1 | 12/2009 | Olson et al. |
| 2010/0031616 A1 | 2/2010 | Gillingham et al. |
| 2011/0185689 A1 | 8/2011 | Raether et al. |
| 2011/0252964 A1 | 10/2011 | Wahlquist et al. |
| 2012/0011815 A1 | 1/2012 | Raether et al. |

FOREIGN PATENT DOCUMENTS

| | | |
|---|---|---|
| EP | 0 146 680 | 11/1986 |
| EP | 0 922 479 | 6/1999 |
| GB | 1 450 573 | 9/1976 |
| WO | 80/00311 | 3/1980 |
| WO | 82/01325 | 4/1982 |
| WO | 2007/149388 A2 | 12/2007 |
| WO | 2009/117579 A1 | 9/2009 |

OTHER PUBLICATIONS

Declaration of Inventor Tom Olson and portions of 1996 Army Manual dated Feb. 27, 2012.
Declaration of Randy Engelland and Chuck Jensen of Nov. 27, 2013.
Declaration of Inventor Thomas Richard Olson dated Apr. 2, 2015.
International Search and Written Opinion dated Jan. 20, 2011.
Allowed claims of U.S. Appl. No. 14/490,377 dated Aug. 18, 2017.
EPAC brochure dated 2010.
Pending claims of U.S. Appl. No. 14/825,258 dated Aug. 18, 2017.

PULSE JET AIR CLEANER SYSTEMS; EVACUATION VALVE ARRANGEMENTS; AIR CLEANER COMPONENTS; AND, METHODS

CROSS-RELATED REFERENCE TO RELATED APPLICATION

The present application is a continuation of U.S. Ser. No. 14/940,377, filed Nov. 13, 2015. U.S. Ser. No. 14/940,377 is a continuation of U.S. Ser. No. 13/010,068, filed Jan. 20, 2011, which issued as U.S. Pat. No. 9,186,612. U.S. Ser. No. 13/010,068 includes the disclosure of, with edits, U.S. provisional 61/297,522, filed Jan. 22, 2010 and U.S. provisional 61/324,493, filed Apr. 15, 2010. The complete disclosures of U.S. Ser. No. 14/940,377; U.S. Ser. No. 13/010,068; U.S. Ser. No. 61/297,522 and U.S. Ser. No. 61/324,493 are incorporated herein by reference. A claim of priority to each of U.S. Ser. No. 14/940,377; U.S. Ser. No. 13/010,068; U.S. Ser. No. 61/297,522 and U.S. Ser. No. 61/324,493 is made to the extent appropriate.

FIELD OF THE DISCLOSURE

The present disclosure relates to air cleaner arrangements. It particularly concerns pulse jet air cleaner systems, in which a pulse jet cleaning flow is directed through a filter cartridge at selected times.

Features, techniques, components and methods described relate, for example, to: advantageous dust evacuation features; advantageous pulse jet control methodology; advantageous filter cartridge features; and, overall assembly configurations.

BACKGROUND OF THE INVENTION

The present disclosure relates to air cleaner arrangements used for example, in vehicles and other equipment. It particularly concerns air cleaners with pulse jet systems, allowing for selected pulse jet cleaning of serviceable filter cartridges therein. This allows for extended service life of filter cartridges and operating life for the vehicle or other equipment before servicing as needed.

A variety of systems for pulse jet air cleaning are known. Examples described in U.S. Pat. Nos. 5,401,285; 5,575,826; 5,683,479, are pulse jet air cleaning systems for vehicles such as the M1 tank. Others described in U.S. Pat. Nos. 6,676,721; 6,872,237; and 6,908,494, are pulse jet air cleaners for a media pack usable in heavy duty equipment such as mining equipment or ore haulers. Each of the previously identified six U.S. patents is incorporated herein by reference.

Further examples of pulse jet arrangements are described in PCT/US2007/014187, filed Jun. 18, 2007, and incorporated herein by reference in its entirety. The PCT application PCT/US2007/014187 (published as WO 2007/149388, on Dec. 27, 2007, incorporated herein by reference) was filed with priority claims to each of three previously filed U.S. provisional applications: U.S. provisonal application 60/814,744, filed Jun. 19, 2006; U.S. provisional application 60/848,320, filed Sep. 29, 2006; and U.S. provisional application 60/921,173, filed Mar. 30, 2007. Each of these three provisional applications is also incorporated herein by reference.

Another example of pulse jet air cleaner systems is depicted in U.S. publication 2009/0308034 incorporated herein by reference. The system depicted in U.S. publication 2009/0308034 includes certain improvements to arrangements of WO 2007/149388 in that a modified form of evacuator valve arrangement is provided.

In general terms, some pulse jet air cleaner arrangements such as those described in PCT/US2007/014187 have an evacuation valve assembly or arrangement thereon. The evacuation valve arrangement allows for evacuation of dust, water and/or air pressure from an interior of the air cleaner assembly, during a pulse jet cleaning operation. The present application, in part, relates to improvements in such evacuation valve arrangements and their use.

The present disclosure also relates to improvements in air cleaner systems and components that may use pulse jet cleaning system and/or evacuation valve arrangements as characterized herein. Further, related methods of assembly and use are described.

SUMMARY

According to an aspect to of the present disclosure, an air cleaner assembly is provided. The air cleaner assembly includes an air cleaner housing; an air flow inlet; an air flow outlet; and, an interior. The housing includes an outer sidewall. A dust ejection port arrangement is provided in the housing. The dust ejection port arrangement includes a dust egress aperture arrangement in the outer sidewall on the housing. A dust receiver is positioned exteriorly of the housing and is oriented to receive dust from the dust egress aperture arrangement.

A variety of examples and features are described. Also techniques of operation and use are described.

There is no specific requirement that an assembly or method include all of the features characterized above, or as defined herein, in order to obtain some benefit according to the present disclosure.

BRIEF DESCRIPTION OF THE DRAWINGS

in FIG. 1, selected portions being shown broken away to show selected internal detail.

in FIG. 3 a portion being broken away to shown internal detail.

DETAILED DESCRIPTION

Figure 1:
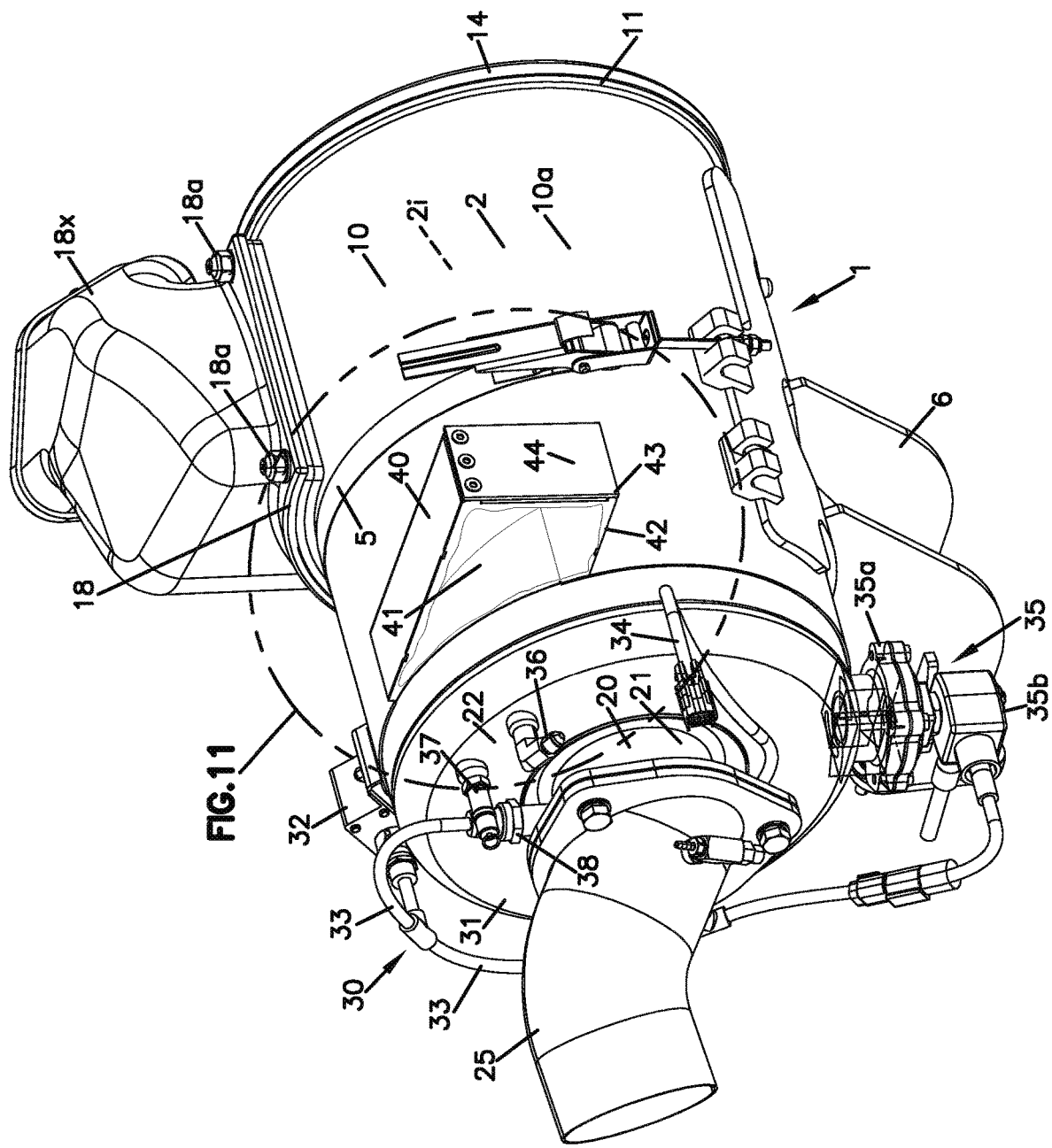
FIG. 1 is a schematic perspective view of a pulse jet air cleaner assembly in accord with the present disclosure.

I. Further Background Regarding Pulse Jet Air Cleaners Generally

A. General Features and Operation of a Pulse Jet Air Cleaner Assembly

In general, pulse jet air cleaner assemblies comprise a housing having an unfiltered air flow inlet and a filtered air flow outlet. The housing typically has an access cover thereon, which is openable and/or removable to allow service access to an interior assembly.

Operably positioned within an interior of the housing, is an air filter cartridge. This filter cartridge is typically configured as a service or serviceable component, and thus is removably mounted within the air cleaner housing. A typical filter cartridge comprises pleated media surrounding an open interior; the media typically extending between opposite end caps. The cartridge typically includes a seal arrangement, which removably seals to a selected portion of the air cleaner housing, when the cartridge is installed. Such a cartridge is described for example in WO 2007/149388 in connection with FIG. 2 thereof; and, is depicted having a seal (radial) thereon, which seals around an air flow outlet tube. As an alternative, an end (axial) seal on the cartridge can be used; see WO 2007/179388 at FIG. 22.

In a typical air cleaner, air to be filtered is brought into the housing, through the air flow inlet. The air is then directed through the media of the filter cartridge, typically with an out-to-in flow pattern, with the filtered air reaching the open interior of the cartridge. The filtered air is then directed into an outlet tube, by (from) which it is removed from the housing.

In use, periodically the cartridge becomes occluded with dust or other particulate material collected thereon. In a pulse jet air cleaner, dust is periodically (i.e. when selected) pulsed off the cartridge and out of the housing. Typically, this is done by providing an arrangement for directing a pulse jet of air into the cartridge interior, against the direction of outlet flow. This will, in part, pulse collected dust material on the exterior of the cartridge off the cartridge and typically out an evacuator arrangement provided for this purpose. Descriptions of such features are found in each of WO 2007/149388 and US 2009/0308034, incorporated herein by reference.

It is noted that the source of pulse air can be a compressed air tank or charge tank configured as part of the air cleaner or separately. Some example features related to this are described in the examples of WO 2007/149388 and US 2009/0308034. A variety of arrangements can be used to control when the pulsing occurs. Some approaches to this are described in WO 2007/149388 and US 2009/0308034, incorporated herein by reference.

In part the present disclosure concerns methods and features for evacuation of the dust from the housing. Example prior evacuator arrangements are described in WO 2007/149388 and U.S. 2007/0308034. These arrangements can be advantageous in certain applications for use. However, modifications are desirable, in certain circumstances, as discussed herein below. The present disclosure, then, relates, in part, to provision of modifications to the evacuator valve arrangement to a pulse jet air cleaner assembly.

B. Some Potential Issues with Prior Pulse Jet Air Cleaner Arrangements

An issue in pulse jet air cleaner, is getting a good quality evacuation of dust from the interior of the housing outwardly.

In accord with the present disclosure, in general improvements and arrangements providing for dust egress from a pulse jet air cleaner are provided. These improvements generally relate to providing for arrangements facilitating dust egress, which in part use, to advantage, swirling action of dust within the housing. These improvements can provide advantageous dust ejection.

Also, in some applications it may not be practical to position an egress for the dust from the housing through an evacuator valve arrangement at the bottom of the air cleaner. For example, in some vehicles this may not be a practical location due to other structure on the vehicle. Also, in some instances it may be desirable to have an evacuator egress from the housing be above the bottom of a air cleaner housing, for example because is expected the air cleaner may be partly submerged, during a water fording operation, when dust ejection is desired. The present disclosure, in part, relates to methods and techniques for providing dust egress, from a dust evacuator valve arrangement, that can be positioned at a location above a lower most portion of the air cleaner.

Advantageous features for an air cleaner assembly and components are described, when the air cleaner assembly is to be used in a pulse jet mode in accord with the descriptions herein. Such features include: filter cartridge features; dust evacuator valve features; and, selected housing features.

Herein, some advantageous pulse control logic approaches, for achieving enhanced pulse cleaning effects are described. These can be applied in a variety of pulse jet air cleaning systems, to advantage.

II. An Example Pulse Jet Air Cleaner Assembly

The reference numeral 1, FIG. 1, indicates a pulse jet air cleaner assembly in accord with the present disclosure. Referring to FIG. 1, the pulse jet air cleaner assembly 1 comprises an air cleaner housing 2. The air cleaner housing 2 is positioned secured by mounting band 5 to support bracket 6. The support bracket 6 can, for example, be a portion of a frame, or structure mounted on the frame, of equipment with which the air cleaner assembly 1 is to be used. Typically, the equipment is a vehicle and the air cleaner assembly is used to filter intake air for an internal combustion engine.

Still referring to FIG. 1, the air cleaner housing 2 generally comprises a cartridge receiving chamber or portion 10, defined by a housing sidewall 10a having an open end 11 over which is received an openable access cover 14. Typically, the access cover 14 is configured to be removable, for service access to an interior 2i of the air cleaner housing 2.

Still referring to FIG. 1, the air cleaner assembly 1 is provided with an inlet arrangement 18 by which air to be filtered is directed into an interior of the air cleaner housing 2. In the example depicted, an inlet duct 18x is shown at the inlet arrangement 18. The air cleaner assembly 1 is also provided with an outlet arrangement 20 by which filtered air is removed from the air cleaner housing 2. In this example, the outlet arrangement 20 comprises an outlet tube 21 positioned in an end 22 of housing 10 opposite open end 11. The outlet tube 21 is depicted positioned with duct arrangement 25 secured thereto, by which filtered air can be directed, for example, to an engine air intake.

As indicated previously, air cleaner assembly 1 is a pulse jet air cleaner assembly, and includes componentry for selectively providing for a pulse jet of air thereto, in use. Referring to FIG. 1, at 30 is provided a pulse jet assembly or system. The pulse jet assembly 30 for the depicted arrangement includes a charge (or accumulator) tank 31 for containment of compressed gas, for example air, used for operating a pulse jet system. The pulse jet assembly further includes appropriate valve and flow direction arrangements, along with a control arrangement as selected, for directing a pulse of gas from charge tank 31 through an internally received filter cartridge, as desired. Still referring to FIG. 1, for the example assembly 1 depicted, the pulse jet assembly 30 includes: controller 32, electrical line 33 including line 34 for electrical communication with a power source and any onboard equipment source necessary; valve assembly 35 including valve 35a and solenoid unit 35b. Nozzle 36 provides a fitting for a compressed air line. A pressure relief valve from tank 31 is indicated generally at 37. At 38, a restriction sensor is provided, for monitoring a pressure differential between regions downstream of an internally received filter cartridge and upstream (typically the atmosphere exterior of the housing). These components can be used together, to provide for operation and control of the pulse jet assembly 30. More description relating to this is provided herein below.

The pulse jet air cleaner assembly 1, and the pulse jet assembly 30, can include many features generally in accord with the arrangements of WO 2007/149388 and/or U.S. 2009/0308034, incorporated herein by reference.

Still referring to FIG. 1, the housing 2 includes a dust evacuator arrangement 40 thereon; arrangement 40, FIG. 1, being depicted with portions broken away to view internal detail. The dust evacuator arrangement 40 comprises a dust egress arrangement 41 in the sidewall 10a of the housing 2, by which air and dust can evaluate an interior 2i of the housing 2. The evacuator valve arrangement 40 further includes a dust receiver (or receiver housing) 42 positioned exteriorly of the air cleaner housing 2, to receive air and dust from dust egress arrangement 41. The dust receiver 42 includes a dust outlet aperture or port arrangement 43 therein, positioned so that dust can be evacuated exteriorly from the receiver or receiver housing 42. In the example depicted the aperture 43 is covered by an evacuator valve member 44. Alternatives are possible, as discussed below.

Figure 2:
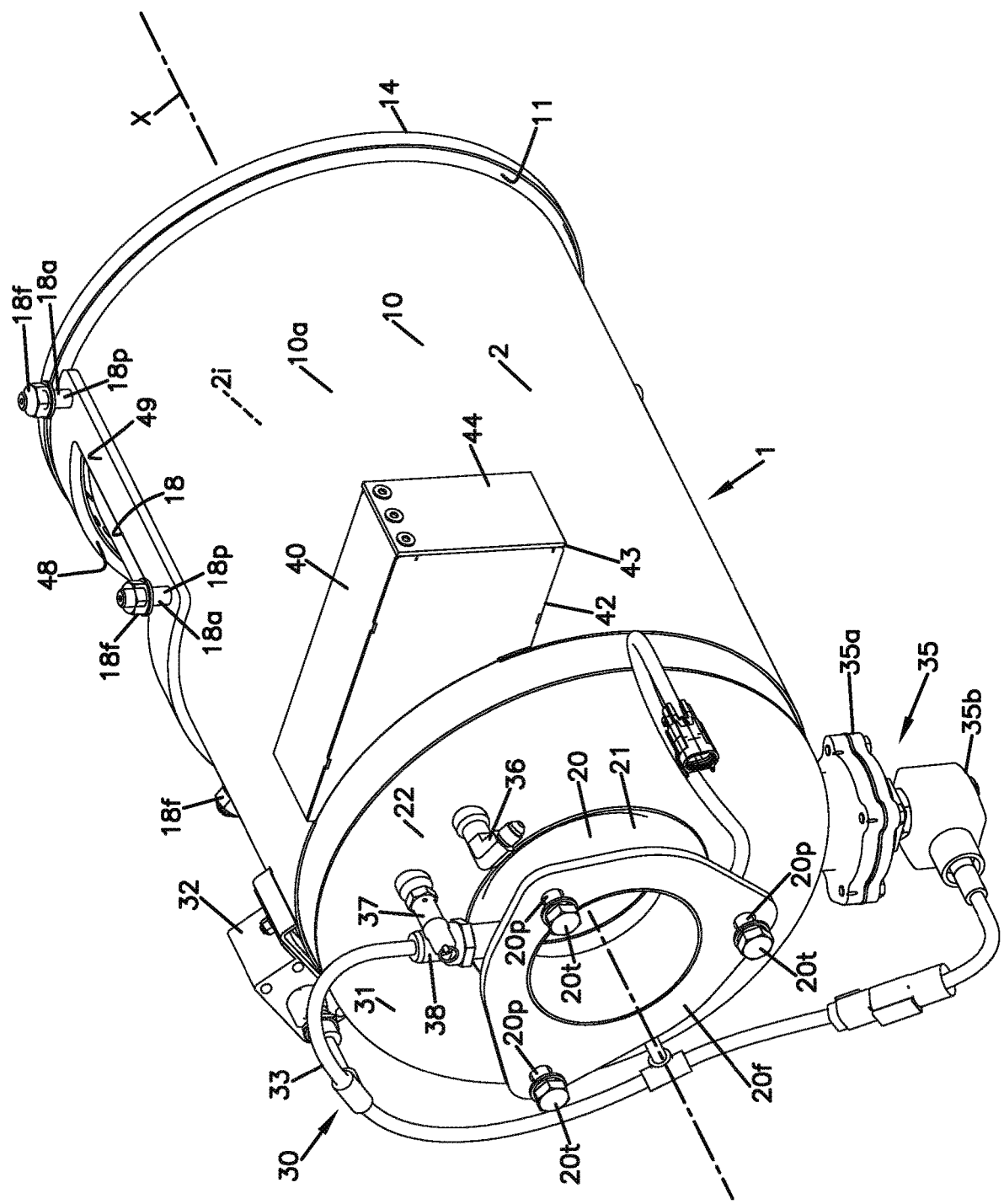
FIG. 2 is a schematic depiction of the assembly of FIG. 1, with an inlet duct arrangement and outlet arrangement removed.

In FIG. 2, a drawing of selected portions of FIG. 1 is depicted. It is noted that in FIG. 2, the assembly 1 is depicted with: the inlet duct 18x of inlet arrangement 18, FIG. 1, removed. In FIG. 2, inlet arrangement 48 in sidewall 10a can thus be seen. The inlet arrangement 48 is shown surrounded by a mount 49 including mounts 18a for the inlet duct 18x. The mounts 18a comprise posts 18p and fasteners 18f, in the example depicted. The mounting arrangement can, for example, comprise a threaded post/nut arrangement, if desired. For the example depicted, four mounting posts 18p are provided, two being fully viewable in FIG. 2. (It is noted that a gasket can be positioned between mount 49 and inlet duct 18x (FIG. 1), if desired.

Also referring to FIG. 2, outlet duct 25 is shown removed from outlet tube 21. Here, a mounting flange 20f with mounting posts 20p thereon, including fasteners 20t, is shown, for use in securing duct 25 in position. Again, a threaded post/nut arrangement can be used, as depicted. A gasket 20 can be positioned flange 20f, to facilitate sealing to duct 25, FIG. 1.

Still referring to FIG. 2, housing 2 (and thus assembly 1) can be characterized as having a central longitudinal axis X passing therethrough. The axis X is generally surrounded by the sidewall 10a. Thus, in a typical assembly, the sidewall 10a will be tubular with a generally circular cross-section, although variations are possible.

Referring to FIGS. 1 and 2, it is noted that the particular housing 2 depicted, is configured with a componentry positioned so that in general use, axis X will be positioned substantially horizontally. It is noted that many of the features and techniques described herein can be applied in a situation in which the housing is configured for central axis to extend generally vertically, in use. An example of such assembly is described herein below, in connection with FIG. 15.

Figure 3:
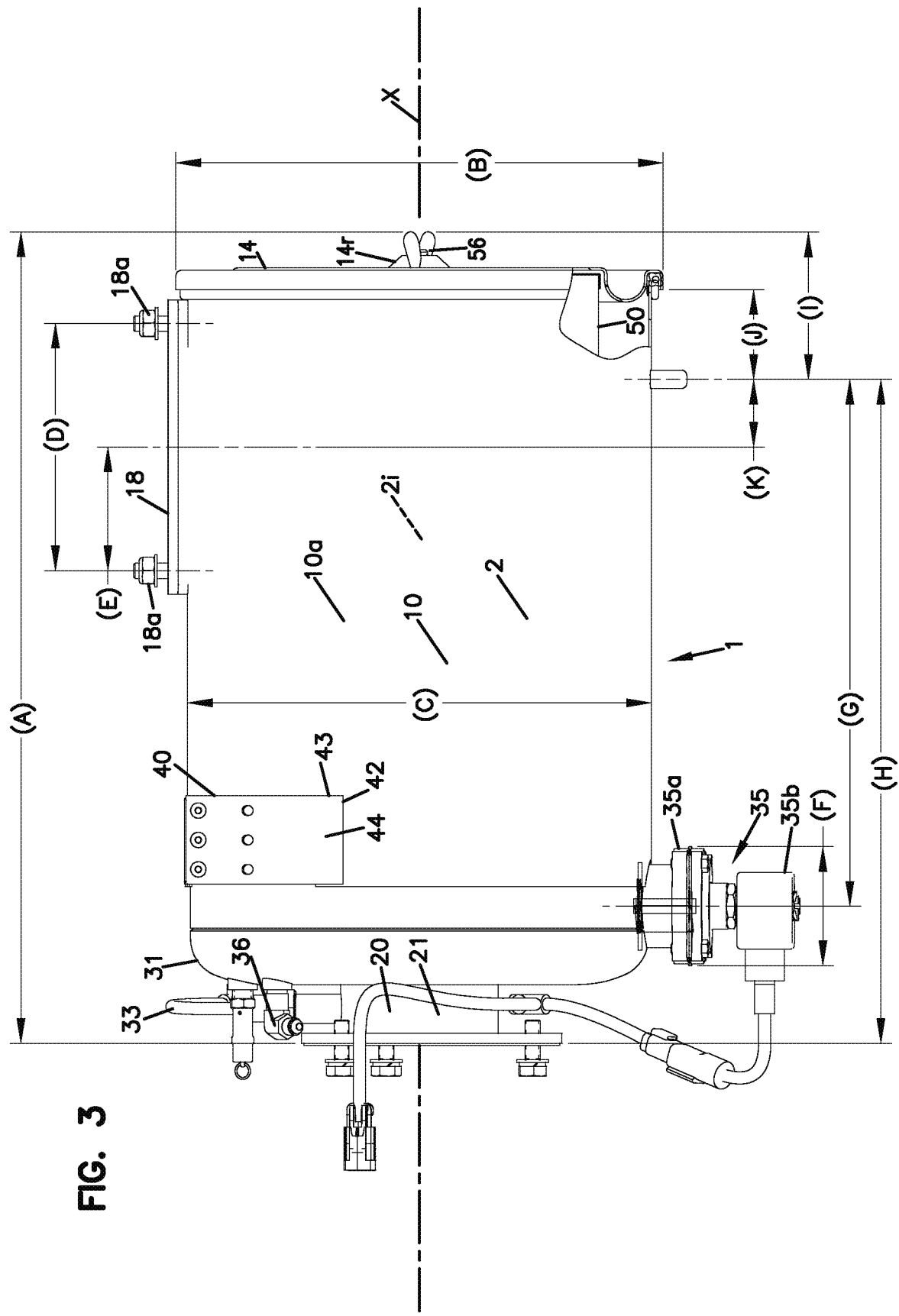
FIG. 3 is a schematic side elevational view of the componentry depicted in FIG. 2.

In FIG. 3, a side elevational view of the componentry depicted in FIG. 2 is shown. Referring to FIG. 3, retainer 14r for securing access cover 14 in place is depicted. The example retainer 14r shown is a wing nut, threadably mounted on a central yoke post 56, extending through an interior of housing 2.

Figure 4:
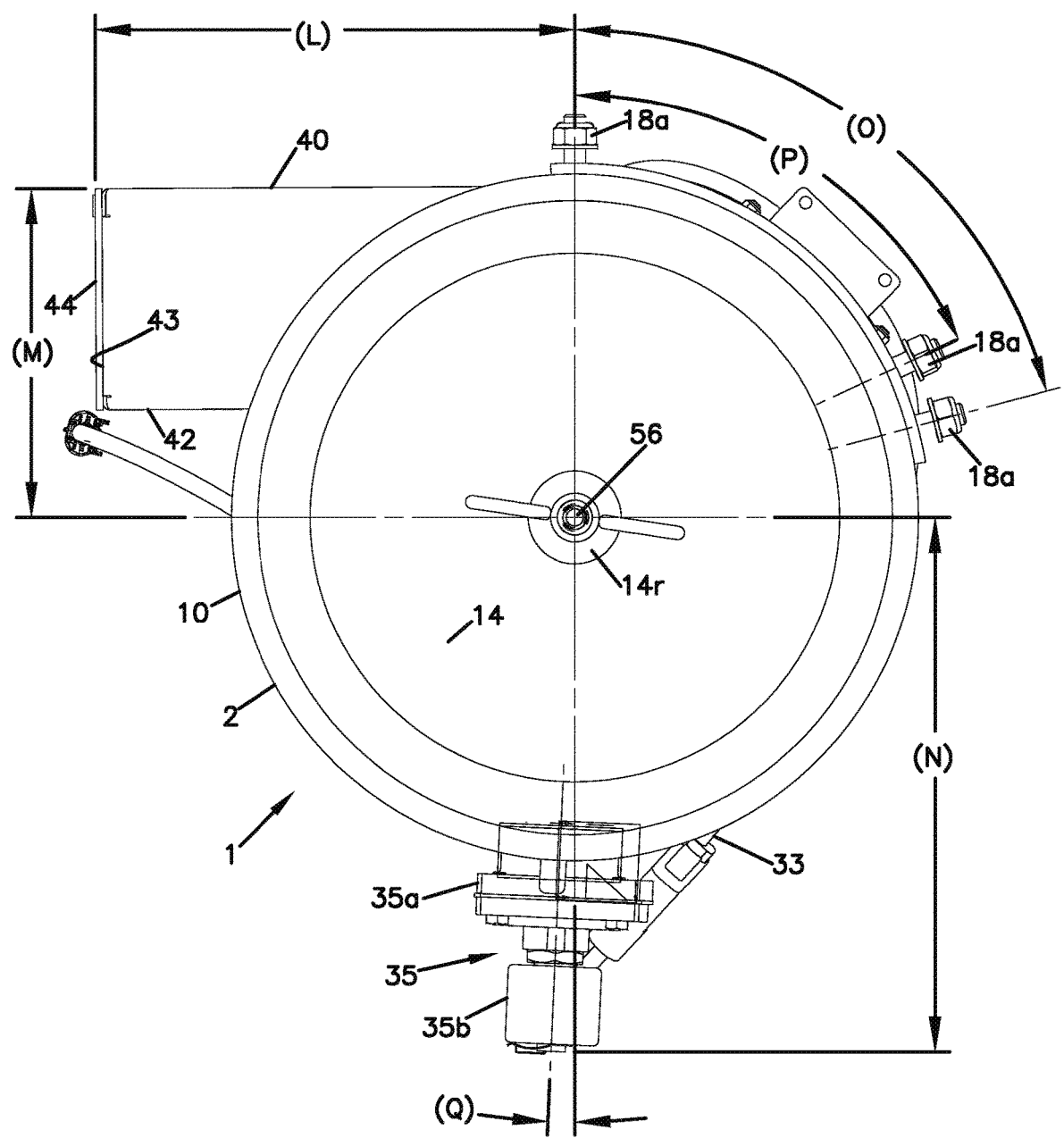
FIG. 4 is a schematic access cover end elevational view of the componentry depicted in FIGS. 2 and 3.

In FIG. 4, an end elevational view of the assembly 1 is provided. The view is toward the access cover 14, and retainer 14r and center post 56 can be seen. Other features previously described are viewable.

Figure 4A:
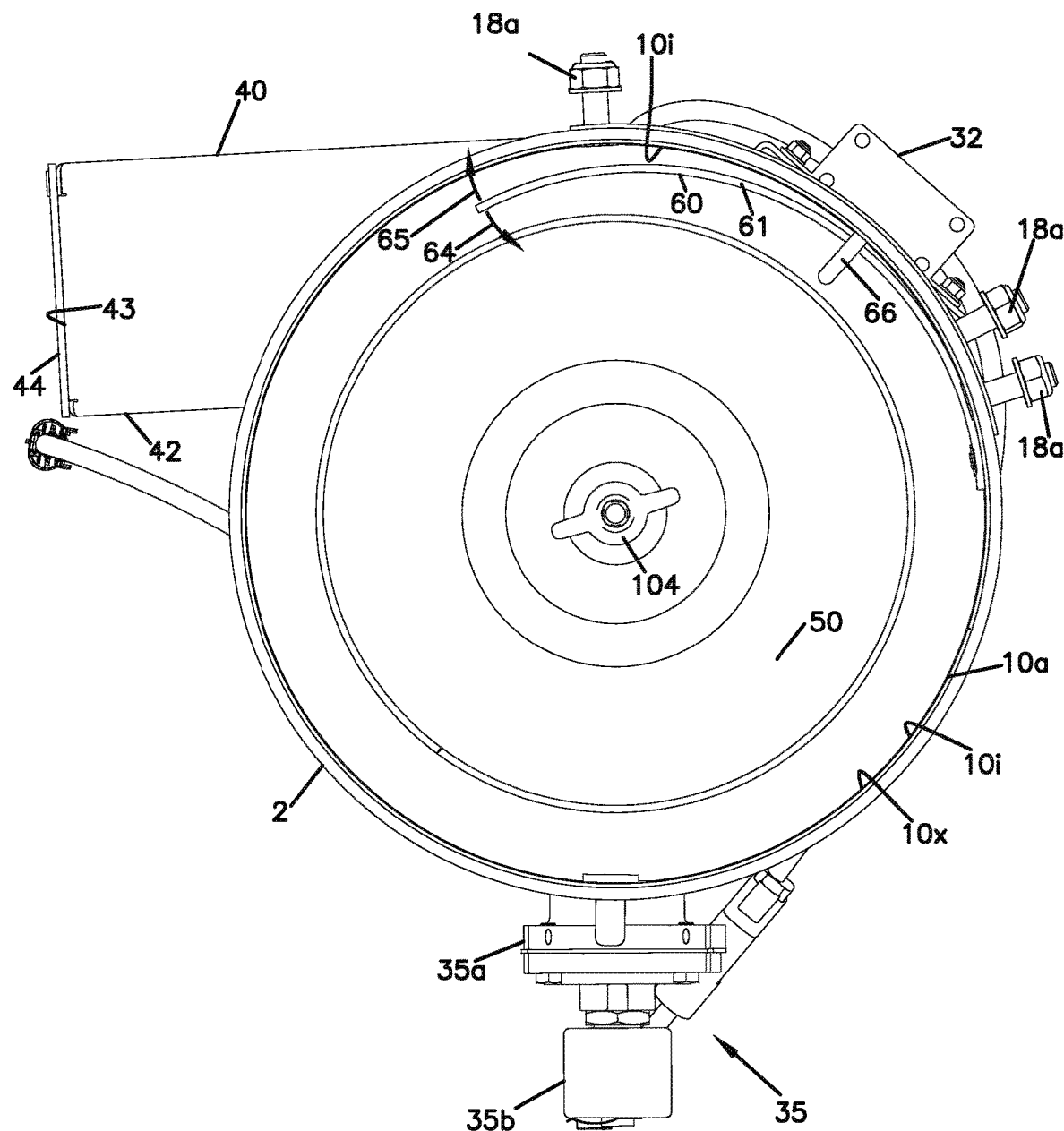
FIG. 4A is a schematic access cover end elevational view analogous to FIG. 4, but showing the assembly with an access cover removed.

In FIG. 4A an end view analogous to FIG. 4 is viewable, but with the access cover 14 (FIG. 4) is removed. A removable cartridge 50 is depicted secured in place by retainer 104 which can be a wing nut. Also, an inlet valve/director member arrangement 60 discussed further below, is viewable.

Figure 5:
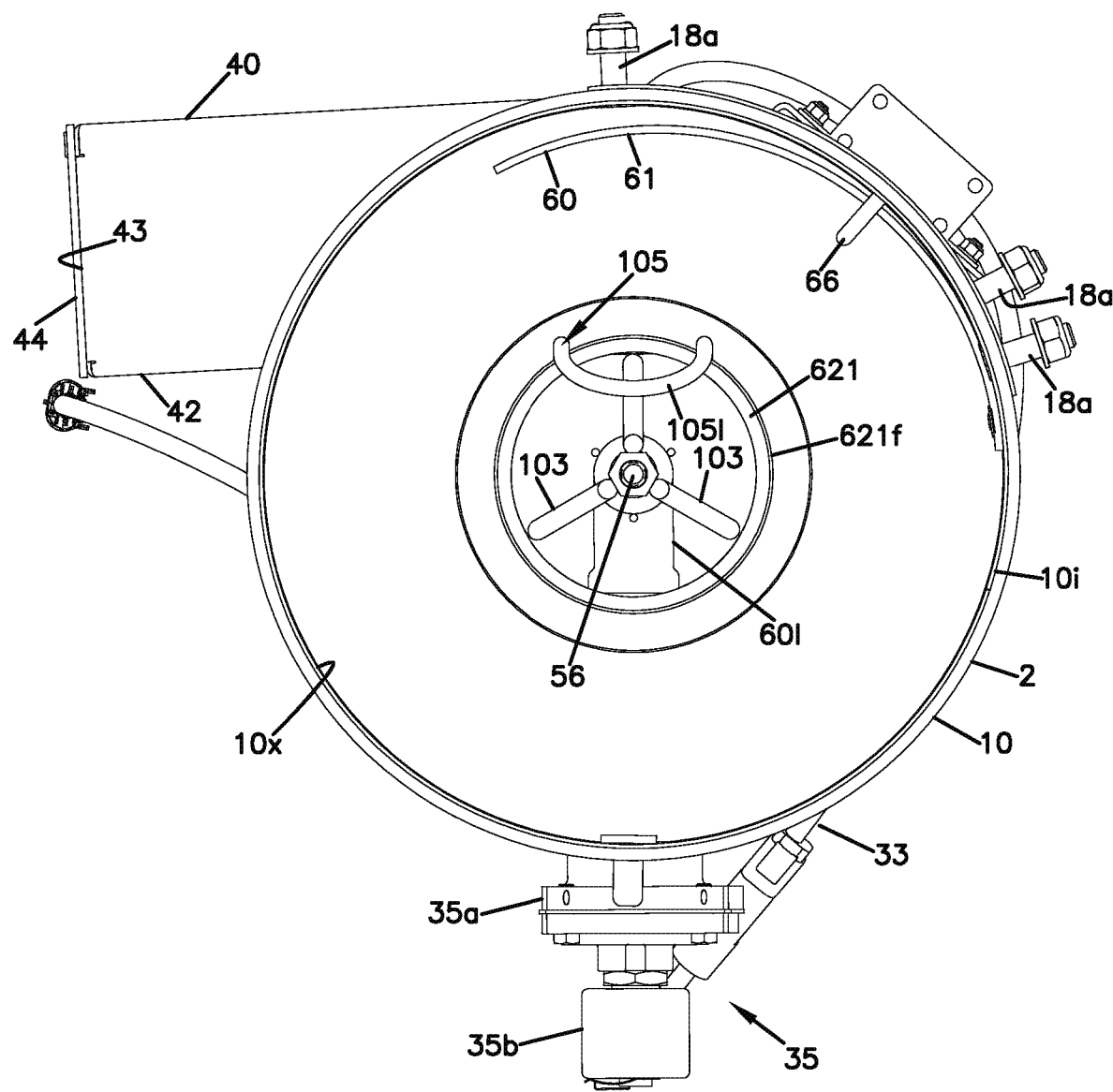
FIG. 5 is a schematic access end elevational view analogous to FIGS. 4 and 4A, but showing the assembly with both an access cover and an internally received filter cartridge removed.

In FIG. 5, an end view analogous to FIGS. 4 and 4A is depicted, with a filter cartridge 50 (FIG. 4A) removed as well as the access cover 14 (FIG. 4). Here a mounting yoke arrangement 103, discussed below, for supporting central mounting post 56 is depicted. Also depicted is a cartridge support/guide rack arrangement 104 discussed further below. Further, a portion of pulse jet distribution arrangement discussed below is viewable.

Figure 6:
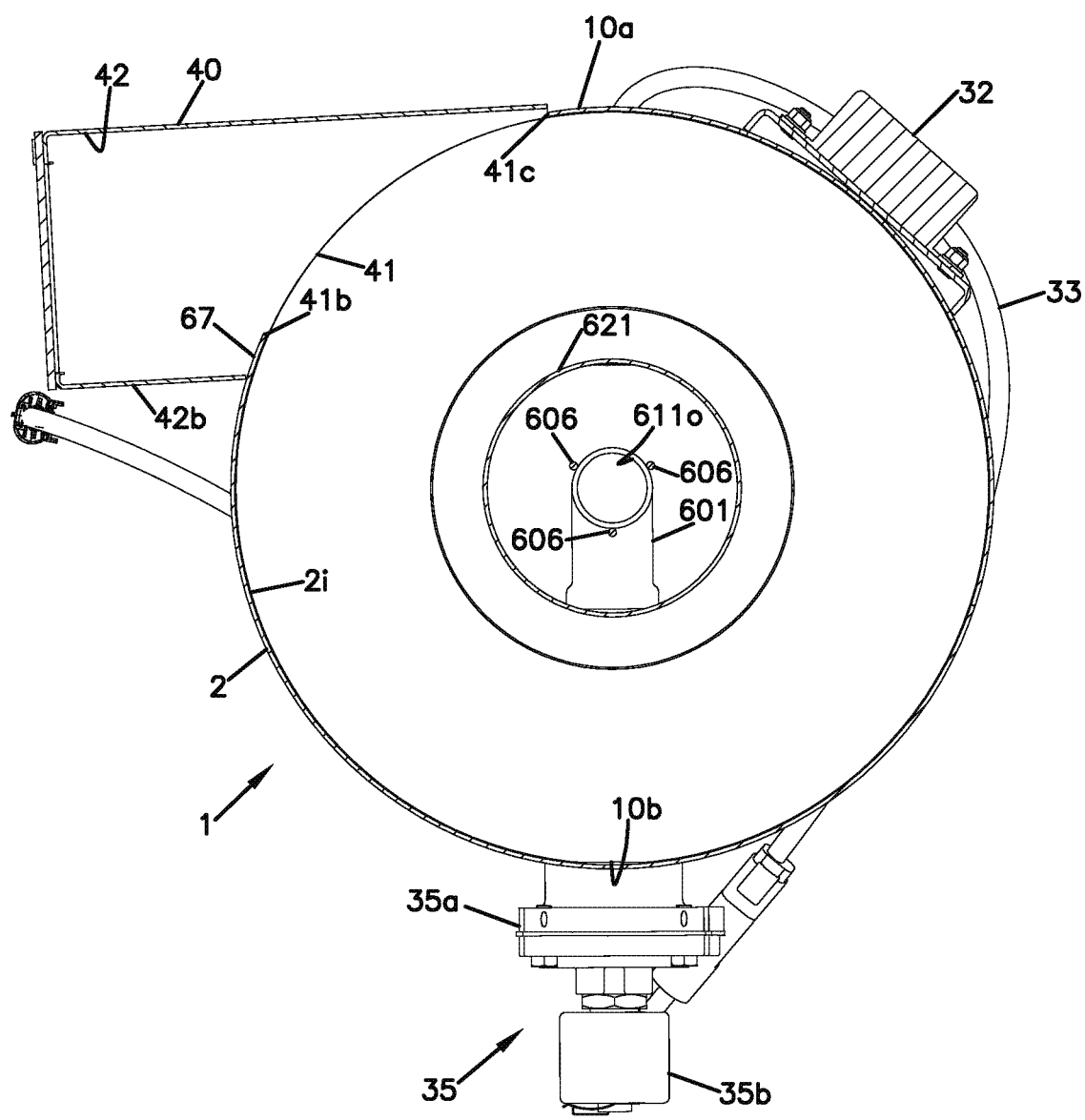
FIG. 6 is a schematic cross-sectional view of the housing componentry depicted in FIG. 5, shown in a cross-section taken through a dust receiver assembly thereof.

In FIG. 6, a cross-sectional view of the housing of FIG. 5 is depicted. In general, a cross-sectional view is taken through the assembly 1 at a location also extending through the dust receiver arrangement 40, in a plane generally perpendicular to central axis X. Dust egress arrangement 41, discussed in further detail below is viewable.

Figure 7:
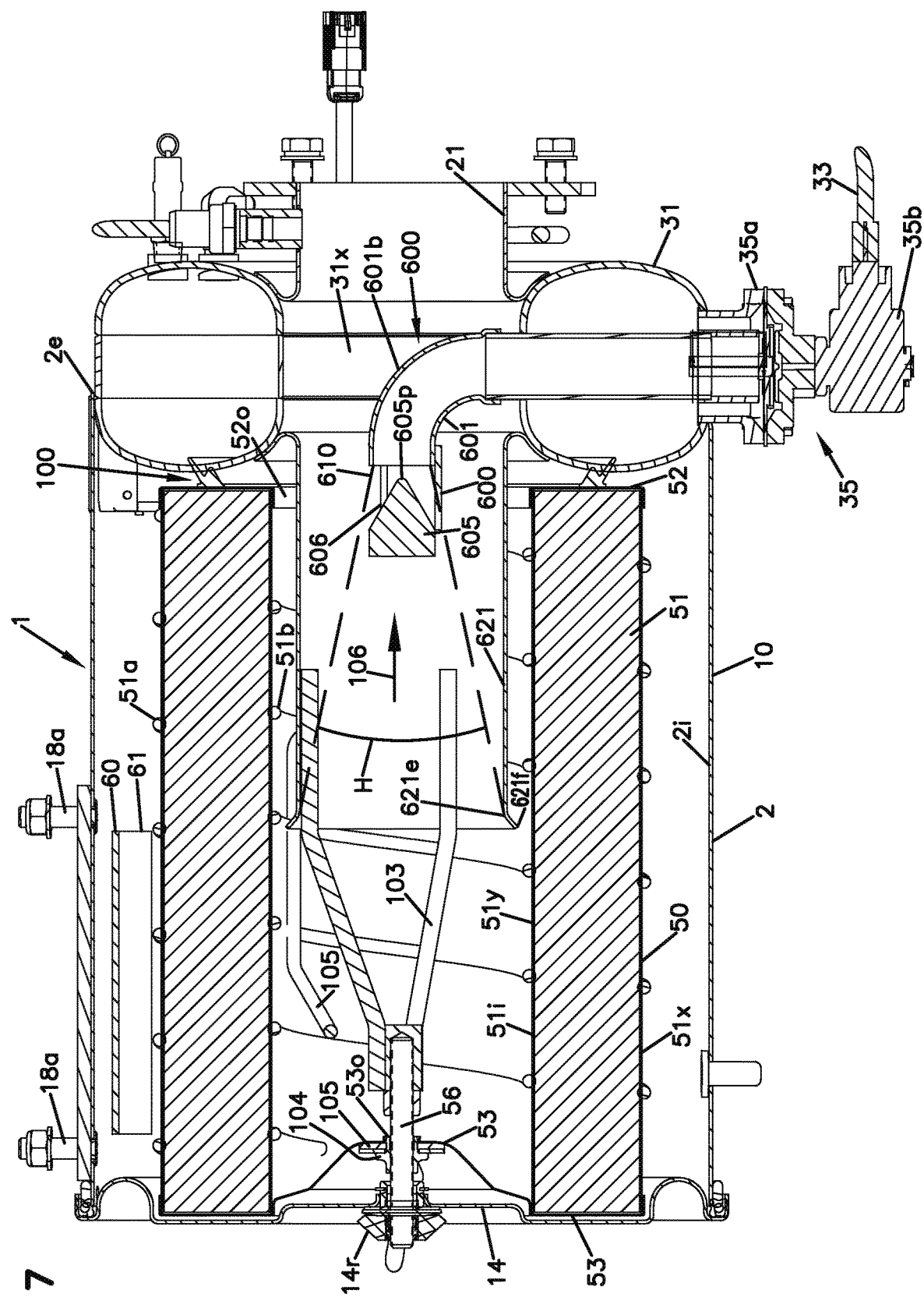
FIG. 7 is a schematic cross-sectional view of the assembly depicted in FIGS. 1 and 2.

Attention is now directed to FIG. 7, a cross-sectional view of the componentry depicted in FIGS. 2 and 3, taken generally at a right angle to the view of FIG. 6. Referring to FIG. 7, the housing 2 is depicted oriented with the outlet 21 on the right and the access cover 14 on the left, an orientation opposite to that shown in FIG. 3.

Referring to FIG. 7, within housing interior 2i is positioned cartridge 50. The cartridge 50 is a serviceable component. By this it is meant that the cartridge 50 can be removed from the housing 2 for servicing and/or replacement. In general terms, the cartridge 50 comprises media 51 extending between first and second end pieces or end caps 52, 53. The media 51 surrounds and defines an open filter interior 51i. For the particular example depicted, the media 51 is positioned between an outer liner 51x and an inner liner 51y, each of which also extends between the end caps or end pieces 52, 53. The liners 51x, 51y would typically be sufficient porous, to allow gas flow through at least selected portions thereof.

Positioned on end cap or end piece 52 is provided housing seal arrangement 100. The housing seal arrangement 100 is discussed in greater detail below. In general, the housing seal arrangement 100 provides that when cartridge 50 is installed, unfiltered air cannot bypass the media 51 to reach outlet 21.

Referring to FIG. 7, access cover 14 is secured in place by wing nut 14r on post 56. Post 56 is supported in place by yoke 103.

Also positioned on post 56 is a second fastener (wing nut) 104. The second wing nut 104 biases against central portion 53c of end piece 53, to secure cartridge 50 in place. Seal gasket 105 is shown positioned between wing nut 104 and end cap 53c. Retainer 104 can be rotatably secured on cartridge end cap 53, or can be a separate component.

In general terms, then, end cap 53c includes a small central aperture 53o therein. The cartridge 50 can be slid over post 56 of yoke 103 with end cap 52 inserted first. Once post 56 projects through aperture 53o, nut 104 can be positioned and tightened in place, to bias cartridge 50 in the direction of arrow 106, to bias seal member 100 into a sealing orientation. Access cover 14 can then be positioned in place by tightening nut 14 over post 56.

Referring still to FIG. 7, attention is directed to guide member 105. In general, the guide member 105 provides a member toward which (and over which) the cartridge 50 is inserted. The guide member 105 helps the service provider position the cartridge appropriately, as it is being pushed in the housing 2. In general terms, the guide member 105 comprises a cartridge support rack/guide. In the arrangement depicted, it is a loop mounted structurally within housing 1 at a location to extend toward end cap 53 of cartridge 50 when installed. Referring to FIG. 5, the support or rack 105 includes an end loop 105l most remote from outlet 21, which dips downwardly somewhat, when mounted. The cartridge 50, as the service provider inserts it into the housing 1, will extend over the support 105. Downwardly turned end 105l will help the service provider get the cartridge positioned over the support 105, and riding therealong. Thus, bracket 105 will generally support the cartridge as it is pushed into position, facilitating alignment of the post 56 through the aperture 53o, and assisting the service provider in properly aligning the cartridge 50 within the housing 2.

Other features viewable in FIG. 7 that relate to pulse jet air cleaning are discussed in further detail below.

Figure 8:
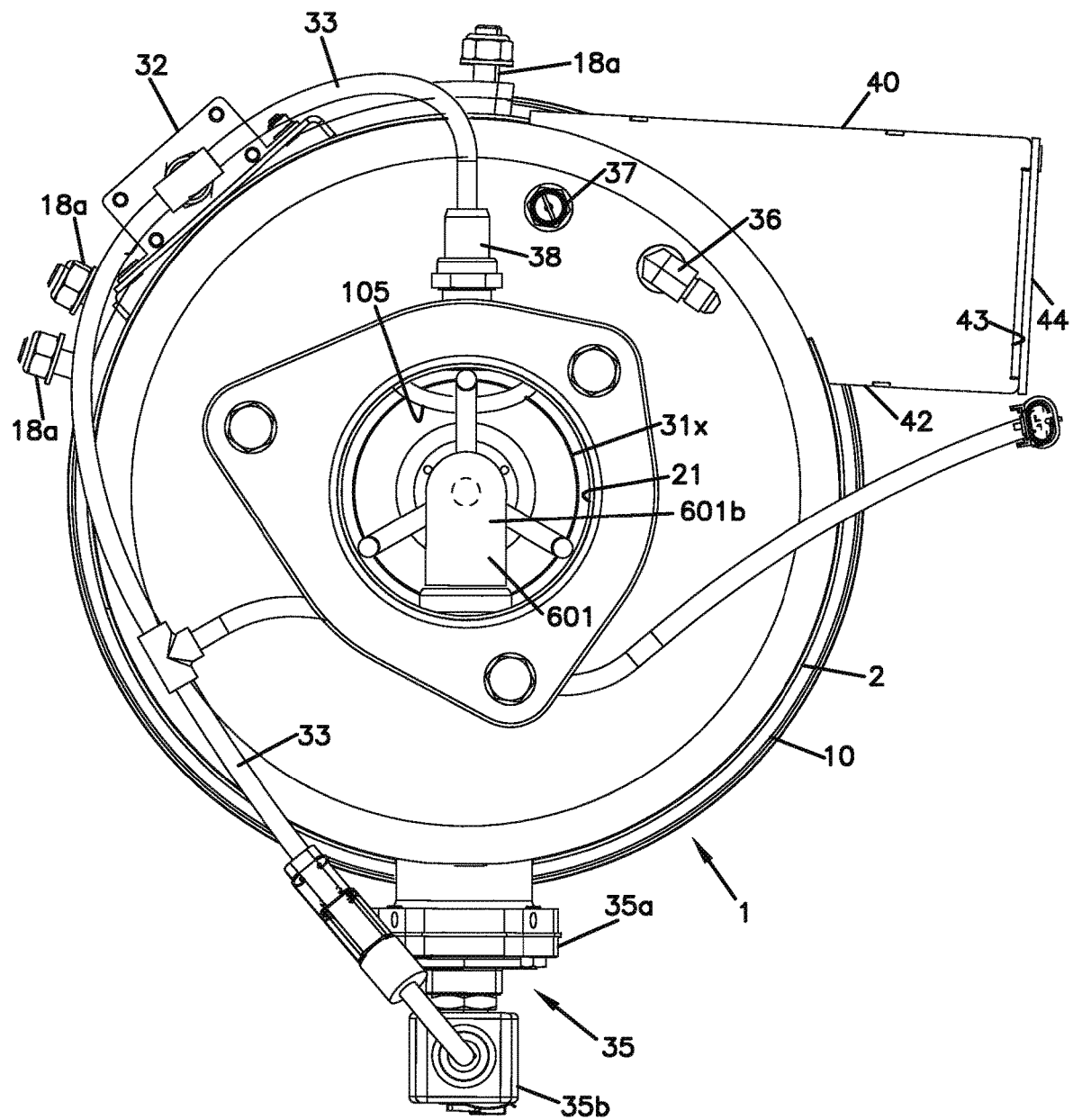
FIG. 8 is a schematic outlet end elevational view of the componentry depicted in FIG. 2.

In FIG. 8, an end elevational view taken toward the outlet end of the housing 2 is provided. Thus, in FIG. 8, the view is generally toward outlet tube 21. Selected features previously characterized are viewable. It is noted that in FIG. 9, an analogous view is provided, but with some dimensions discussed below indicated.

Figure 9:
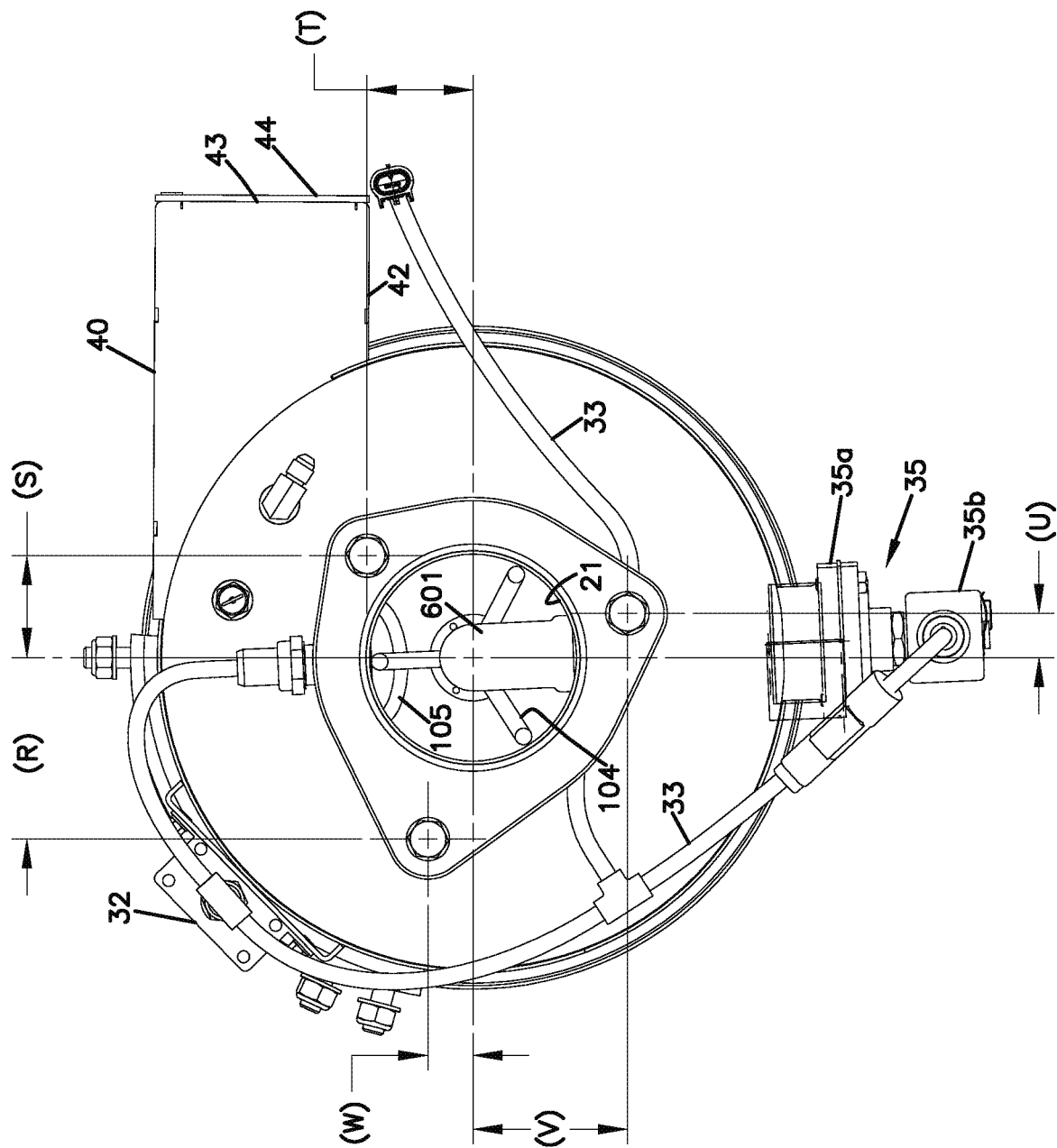
FIG. 9 is a schematic view analogous to FIG. 8, depicting some example dimensions.

It is noted that in FIGS. 3, 4 and 9, some example dimensions, for an example unit are depicted. These are intended to be examples only, with the techniques being applicable in a wide variety of units. The indicated dimensions are generally as follows: in FIG. 3, an assembly length A indicated as =525.2 mm; an access cover diameter B being indicated as 315.2 mm; a housing internal diameter C being indicated as 300 mm; with other dimension indicated as follows: D=160 mm; E=80.1 mm; F=76.8 mm; G=341.1 mm; H=429.9 mm; I=95.2 mm; J=58.0 mm; and, K=43.9 mm.

Figure 10:
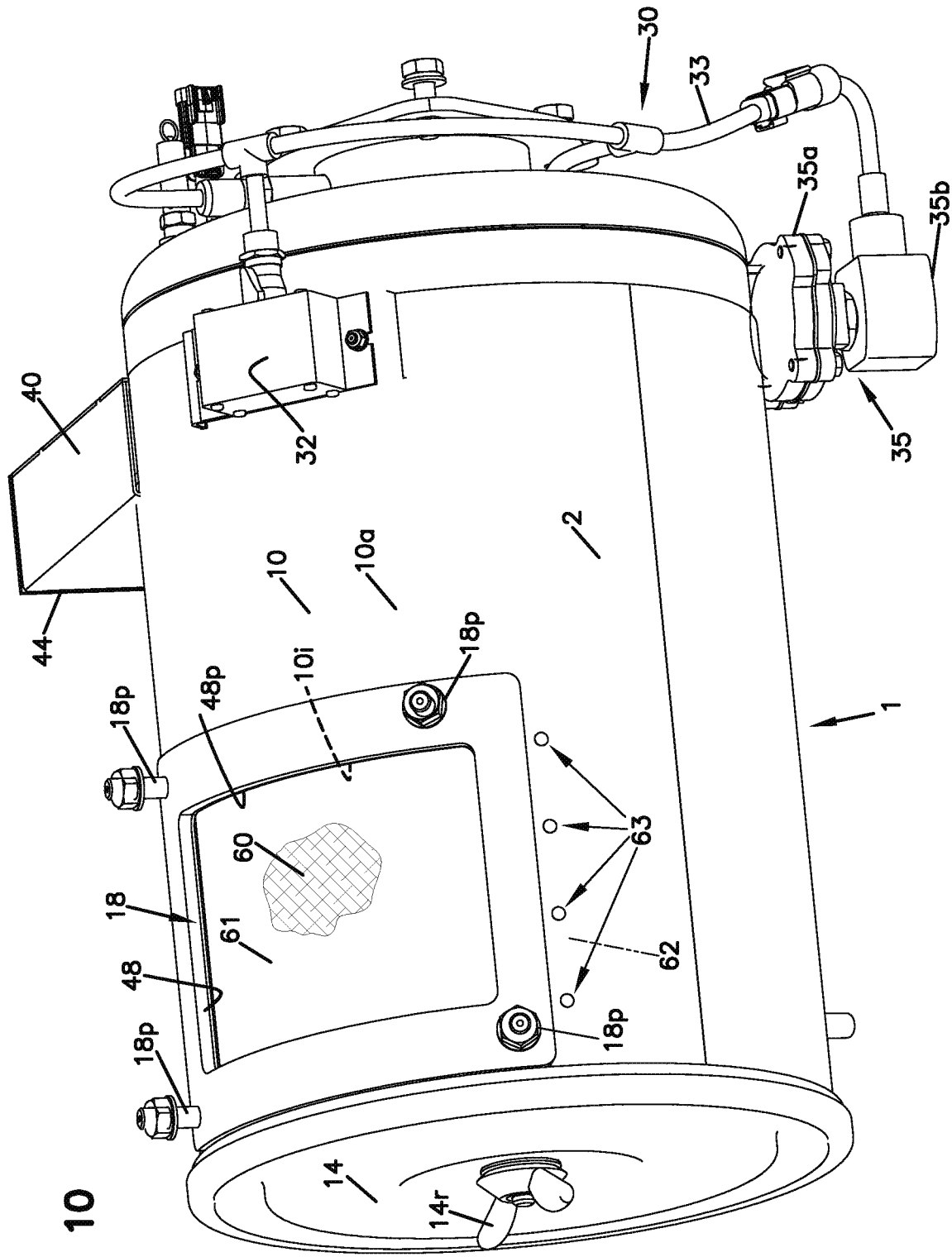
FIG. 10 is a schematic perspective view of the assembly of FIG. 1, shown with a view toward the access cover end and with certain inlet, outlet, and mounting features removed.

In FIG. 4 some example dimensions and angles are indicated as follows: dimension L=220.1 mm; dimension M=150.9 mm; dimension N=245.5 mm; angle O=75°; angle P=65°; and, angle Q being 3°. In FIG. 9, example dimensions are as follows: dimension R=86.3 mm; dimension S=48.5 mm; dimension T=50.3 mm; dimension U=21.1 mm; dimension V=73.2 mm; and, dimension W=21.4 mm Attention is now directed to FIG. 10. In FIG. 10 is provided a schematic depiction of the pulse jet air cleaner assembly 1, modified from FIG. 1 in that the inlet arrangement 18 is removed; and, the view is toward the access cover end.

Referring to FIG. 10, at 48 an inlet aperture arrangement is depicted (as part of inlet arrangement 18) in (i.e. through) the housing sidewall 10a. For the particular example depicted, the inlet aperture arrangement 48 generally defines an arcuate, rectangular, perimeter 48p, although alternatives are possible. At 18p the mounting posts are depicted. The inlet aperture arrangement 48 depicted is a single aperture, although alternatives are possible.

Still referring to FIG. 10, air cleaner assembly 1 includes, positioned in interior 2i, in extension over inlet aperture arrangement 48, an inlet valve/director arrangement 60. For the example depicted, the inlet valve/director arrangement 60 comprises a flap 61 hingedly secured along edge 62 by fastener arrangement 63 to an interior 10i of sidewall 10a. Thus, the flap 61 can deflect inwardly from the housing sidewall 10a, or can be pressed radially outwardly against the sidewall 10a depending in the flow/pressure condition within interior 2i.

In general terms, the valve/director arrangement 60 can be characterized as having first and second orientations or positions. In the first orientation or position, the inlet valve/director arrangement is open, i.e. flap 60 is biased away from sidewall 10i, allowing air to enter interior 2i through aperture arrangement 48. In the second position or orientation, the valve/director arrangement 60 is oriented closed, i.e. with flap 61 biased against sidewall 10i closing aperture 48.

Attention is now directed back to FIG. 4A. In FIG. 4A flap 60 is shown biased away from sidewall 10i, at least partially. This allows air to enter aperture arrangement 48, FIG. 10. It is understood that the flap 60 may deflect further away from wall 10i, FIG. 4A in actual use. This would be indicated by arrow 64. On the other hand, arrow 65 suggests how the flap 60 would move under internal pressure, to close aperture 48. Support 66 is provided, underneath flap 60, to inhibit inversion of the flap 60, and also to help hold the flap 60 up and out of the way during servicing of cartridge 50.

The inlet valve/director 60, i.e. flap 61, can be (in general) in accord with arrangements described in WO 2007/149388 and U.S. 2009/0308034, and incorporated herein by reference.

In general terms, the inlet arrangement 18, in combination with the inlet valve/director 60, when generally as depicted herein, can be characterized as a tangential inlet flow arrangement or assembly. By the term "tangential" in this context, it is meant that air flow into interior 2i is generally not directed (specifically and directly) toward a central axis X, FIG. 2, of the housing sidewall 10a and cartridge 50, but rather is directed into a circular (cyclonic) pattern around the outside of the cartridge 50, in part against interior surface 10i of sidewall 10a. This tangential direction is facilitated by the inlet valve/director 60, because as air enters through inlet 18, FIG. 1, the flap 61, FIG. 4A, will deflect downwardly toward the cartridge 50. This will cause air flow into interior 2i to adopt a spiral pattern, in this instance, counter clockwise when viewed toward end 11 of housing 2; i.e. from the orientation of FIG. 4A although an opposite flow direction is possible.

In general terms, then, the tangential inlet flow arrangement is configured to direct air flow passing into an interior 2i of the housing 2, into annulus 10x surrounding the cartridge 50 interiorly of sidewall 10a, in a pattern that is generally circular around central axis X, FIG. 2, rather than being directed toward central axis X, FIG. 2.

Herein, in general terms, the air cleaner housing or (assembly) will sometimes be characterized as having or defining a cyclonic or spiraling dust direction, or a dust rotation direction. This is meant to indicate the general direction of spiral movement of the dust entering the housing, around the cartridge 50. The particular housing depicted, FIG. 5, is configured with a counter-clockwise direction, when viewed in the orientation of FIG. 5. Of course, the componentry can be configured for an opposite clockwise direction if desired.

It is noted that cyclonic or spiraling dust direction (i.e. dust rotation direction) can be provided by other structure within the assembly 1. An example described below involves a fin arrangement positioned on the cartridge. As described below, when alternate arrangements provided for causing dust spiraling or rotation, it may be that the inlet does not need to be a tangential arrangement.

It is noted that when the pulse jet assembly 30 is operated, the inlet valve/director 60, i.e. flap 61, under pressure provided interiorly of housing 2 by the pulse jet, will deflect back, closing aperture arrangement 48 briefly. This will help inhibit ejection of dust from interior 2i out inlet aperture arrangement 48. In addition, as the flap 61 closes aperture arrangements 48, pressure in interior 2i of housing 2 will build, facilitating a push of dust, from the pulse, out of interior 2i and into dust receiver 42.

More specifically, when the pulse jet air cleaner assembly 30 is operated to pulse a cleaning jet of air through cartridge 50, and the inlet valve/director 60 is closed, the dust is generally directed exteriorly of the housing 2, via dust egress arrangement 41, and into dust receiver 42.

The dust egress arrangement 41, FIG. 6 in some application of principles of the present disclosure, is provided with no portion thereof in radial overlap with a lowermost portion 10b of the housing 2 and sidewall 10a; i.e. with no portion thereof directed straight downwardly. In such instances, typically, the lowermost portion 41b (FIG. 6) of the dust egress arrangement 41, FIG. 1 is positioned radially offset from a lowermost portion 10b of the housing sidewall 10a, FIG. 6, around axis X, FIG. 2, by at least 30°, typically at least 45°; and usually at least 75°. Indeed, in some applications, the lowermost portion of the dust egress arrangement 41 is positioned at least 90° rotationally around the housing sidewall 10a (and axis X) from a lowermost portion 10b, so that the entire aperture 41 is positioned in the upper half of the housing, when the housing is positioned with central axis X thereof directed generally horizontally, and with lower port 10b directed downwardly. This is as depicted for the assembly of FIGS. 1-6. Often, no portion of dust egress arrangement 41 is in a portion of the housing directed straight up.

The dust egress arrangement 41 can comprise a single aperture (as depicted in FIG. 1) or plurality of apertures. It can be provided with framework extending thereover, if desired. When the dust egress aperture arrangement 41 comprises a plurality of apertures, when reference is made herein to a lowermost portion, reference is meant to the radially lowermost portion of the lowermost aperture, around central axis X.

Referring to FIG. 6, a typical egress arrangement 41 can be seen. The typical aperture 41 extends, in housing sidewall 10a, over a radial arc (arc from edge 41c to edge 41b, FIG. 6) around central axis X, FIG. 2, of at least 20°, typically at least 30°, usually at least 45° and often within the range of 45°-90°.

When the dust egress arrangement 41 comprises a plurality of apertures, reference to the arcuate extension is meant to radially most spaced apart edges. For the example assembly depicted, in FIG. 6, this would be between opposite edges 41b, 41c and would correspond to an arcuate extension between a radially lowermost edge 41b and a radially uppermost edge 41c.

It is noted that with the assembly as depicted in WO 2007/149388, typically the evacuator aperture in the housing sidewall is directed downwardly in use, and does not extend over as wide an arc.

The arrangement of FIG. 1 also differs substantially from the arrangements of U.S. 2009/0308034. There, although in some instances apertures in the upper half of the housing are depicted, in no example depicted therein are the apertures exclusively positioned and/or sized as described as preferred above, and also depicted oriented to direct dust into a dust receiver arrangement or housing as described.

It is also noted that typically, with the housing 1 positioned with a central axis extending horizontally, FIG. 6, the dust egress arrangement 41 is often positioned with no portion thereof in radial extension across an upper most portion 10u of the housing 2 and sidewall 10a, FIG. 6. Indeed, typically, the uppermost portion 41u of the dust egress arrangement 41, FIG. 1, is positioned radially offset from an uppermost portion of 10u of the housing sidewall 10a, around axis x by at least 3°, typically at least 5° and usually at a location within the range of 3°-25°, although alternatives are possible.

Figure 11:
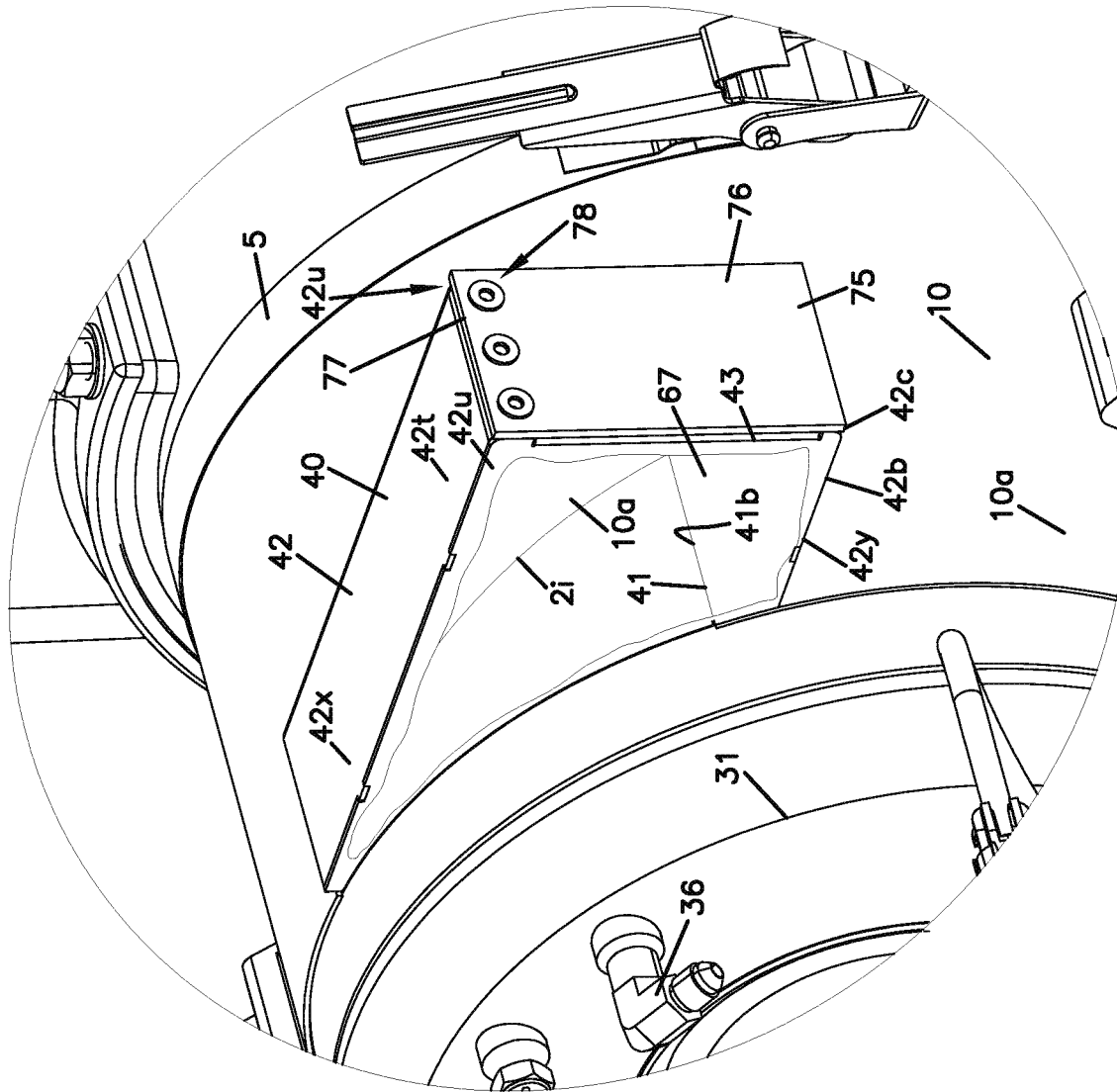
FIG. 11 is a schematic enlarged fragmentary view of a selected portion of FIG. 1.

Referring to FIG. 11, an enlarged of FIG. 1, the dust evacuator arrangement 40 includes a receiver housing 42 positioned to receive dust from interior 2i, as the dust passes outwardly from housing interior 2i through sidewall 10a, i.e. through dust egress arrangement 41. Referring to FIG. 11, the example receiver housing 42 depicted comprises a top wall section 42t, a bottom wall section 42b, and an end 42c. The end 42c is remote from sidewall 10a and is depicted with a port arrangement 43 therethrough, for dust ejection from dust receiver or housing 42.

Still referring to FIG. 11, the receiver housing 42 can also be characterized as having opposite sidewall sections 42u, 42v, each extending between the top section 42t and the bottom section 42b.

In more general terms, and referring to FIG. 11, the receiver housing 42 can be characterized as having first and second, opposite, sidewall sections 42x, 42y. Referring to FIG. 6, when the receiver housing 42 is positioned on an air cleaner housing 2 in which the central axis X extends generally horizontally, the first housing section 42x can be characterized as a top or upper section 42t, and the second, opposite, sidewall section 42y can be characterized as a bottom section 42b. The two sections 42a, 42b generally extend parallel to one another or substantially parallel to one another, however this is not required in all applications of techniques described herein. In general the term "substantially parallel" when used in this context, is meant to refer to section 42x, 42y either extending parallel to one another or extending in planes within +/−10°, inclusive.

Also, typically at least one of the sections 42x, 42y can be characterized as a generally "tangential" section, with respect to the housing outer sidewall 10. By this, it is meant that the referenced section generally extends in a direction away from housing sidewall 10 in a direction substantially tangentially to a circle defined by the outer sidewall 10. By "substantially tangentially" in this context in this context, it is not meant that the section is necessary precisely tangential to such a circle, but rather that it is generally tangential to such a circle, for example in a plane extending at +/−10°, inclusive, of a tangent to such a circle. Of course, for the assembly depicted in FIG. 6, top sidewall section 42t extends generally tangentially to a circle which is defined by the outer sidewall 10o. It is noted that the bottom wall 42b depicted extends generally tangentially to a circle that is somewhat smaller than the housing sidewall 10a, but which is still centered on axis X.

Referring to FIG. 1, it is noted that sidewall section 42x, 42y are generally positioned spaced apart with opposite sidewall sections 42d, 42e extending therebetween. Referring to FIG. 6, for the particular dust evacuator arrangement 40 depicted, inner lip or flange 67 is provided, directed upwardly from the lowermost portion 42b of the housing 40, at egress arrangement 41; the flange 67 ensuring that the bottom 42b is positioned below a lowermost portion 41b of egress arrangement 41. Typically, flange 67 will project upwardly at least 0.5 inch (12.7 mm) above bottom 41b, usually at least 0.6 inch (15.2 mm), and often 0.7-1.25 inch (17.8-31.8 mm), although alternatives are possible. The flange 67 helps inhibit dust in receiver 42 from reentering interior 2i. (Alternately stated, bottom 41b is typically at least 0.5 inch (12.7 mm) below egress 41, usually at least 0.6 inch (15.2 mm) below, often 0.7-1.25 inch (17.8-31.8 mm) below).

From a comparison of FIGS. 1, 2, 4A, 5 and 6 general operation assembly 1 with respect to dust egress will be understood. When the air enters the housing in a cyclonic pattern as described, and swirls around the outside of the cartridge 50, a portion of the dust contained with air will swirl (rotate) around annulus 10x, FIG. 4A, between the cartridge 50 and interior surface 10i of sidewall 10a. Under this cyclonic movement, a portion of the dust will, in due course, be ejected through egress arrangement 41, FIG. 6, into dust receiver 42.

When the pulse jet is operated, dust is blown off the cartridge 50 (by the pulse jet) and into annulus 10x, (and valve/director 60 will close as a result of the pressure). The pulse will force dust from interior 2i, outwardly through egress arrangement 41. Referring to FIG. 4A, it is noted that during pulse jet operation, flap 60 will bias in the direction of arrow 65 against sidewall 10a. This will inhibit dust from being ejected out inlet aperture 48 and will also help provide an increased pressure within housing interior 10i to facilitate dust ejection out dust egress aperture arrangement 41.

In the example assembly 1 depicted, FIG. 11, aperture 43 of dust receiver 42, is covered by a flap valve arrangement 75. The example valve arrangement 75 depicted comprises a valve member 76 secured along edge 77 by fastener arrangement 78. When the pulse jet occurs, valve member 76 will be biased away from aperture 43, allowing dust ejection from housing 40. When the pulse jet is not operated, typically a receiver interior pressure due to air flow through assembly 1, will help pull valve member closed 76 over aperture 43. Typically, the edge 77 along which fastening occurs is a top or upper edge, although alternatives are possible. (Multiple flaps can be used as flap valve arrangement 75).

It is noted that in some systems, it may be desirable to attach dust ejector port aperture 43 to a scavenger system, rather than rely on a valve arrangement.

Figure 12:
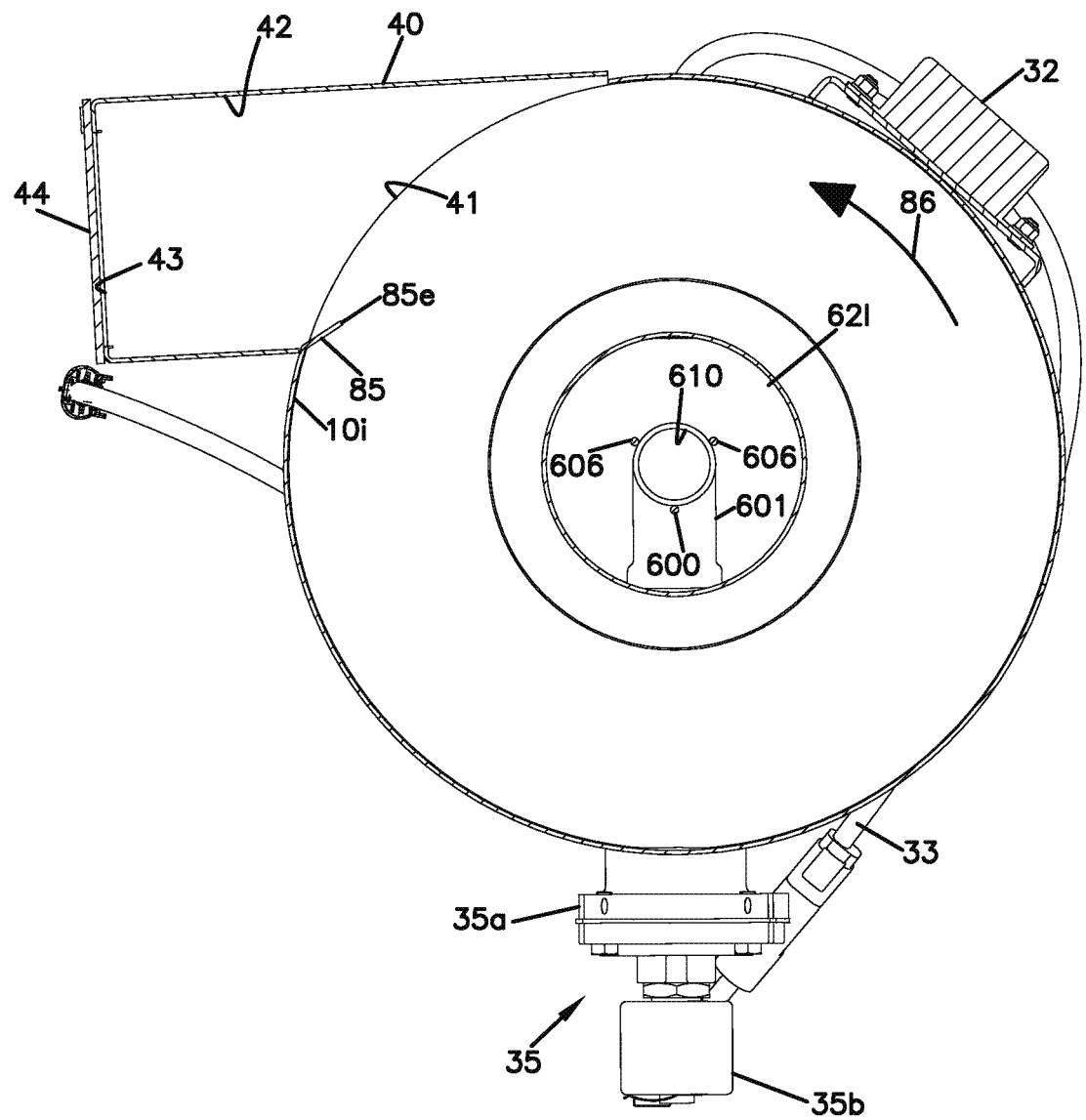
FIG. 12 is a schematic view analogous to FIG. 6, but depicting an optional variation.

In FIG. 12, a view generally analogous to FIG. 6 is provided, with a optional variation shown. In particular, a radially inwardly directed dust collection flange or scoop arrangement 85 is provided, directed radially inwardly from the of dust egress arrangement 41. Edge 85 generally corresponds to the most downstream edge of the dust egress arrangement 41 in a direction corresponding to dust cyclonic radial direction. The radial inward projection or scoop 85, away from interior 10i of sidewall 10a, will facilitate swirling dust collection in the direction of arrow 86 being moved out from interior 10i and into receiver 42. Typically, the most upstream edge or end of flange or scoop 85, indicated generally at 85c will extend radially inwardly at least 0.25 inch (6.4 mm) typically at least 0.5 inch (12.7 mm) from a location corresponding to general curve of the sidewall 10i. It is noted that edge 85 will typically be bent inwardly, but remain contiguous with the wall, rather than being cut and bent inwardly, although alternatives are possible.

III. The Filter Cartridge, FIGS. 13 and 14

Figure 14:
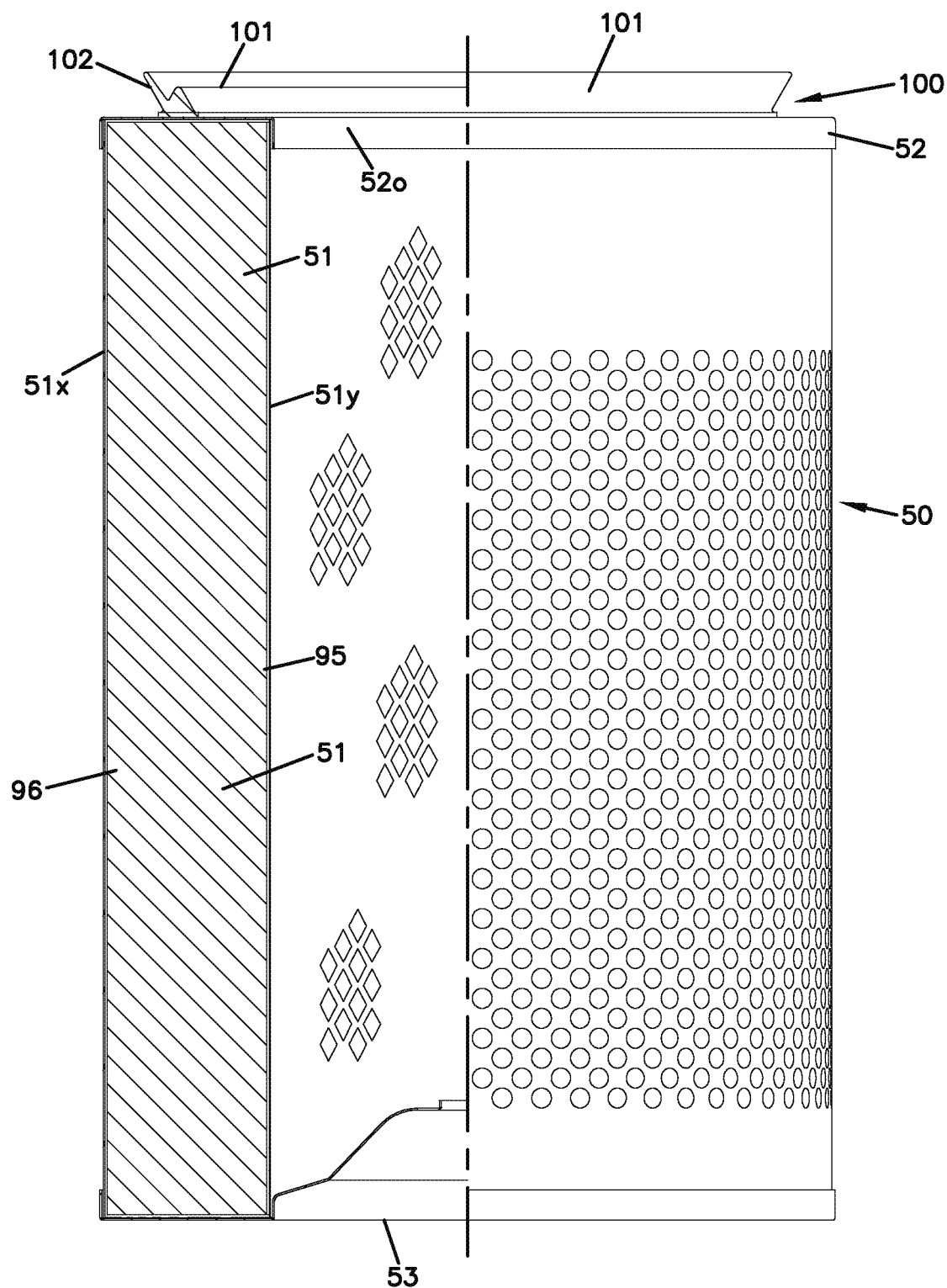
FIG. 14 is a schematic side elevational view of the filter cartridge depicted in FIG. 12, with portions depicted broken away and shown in cross-section to view selected detail.
Figure 15:
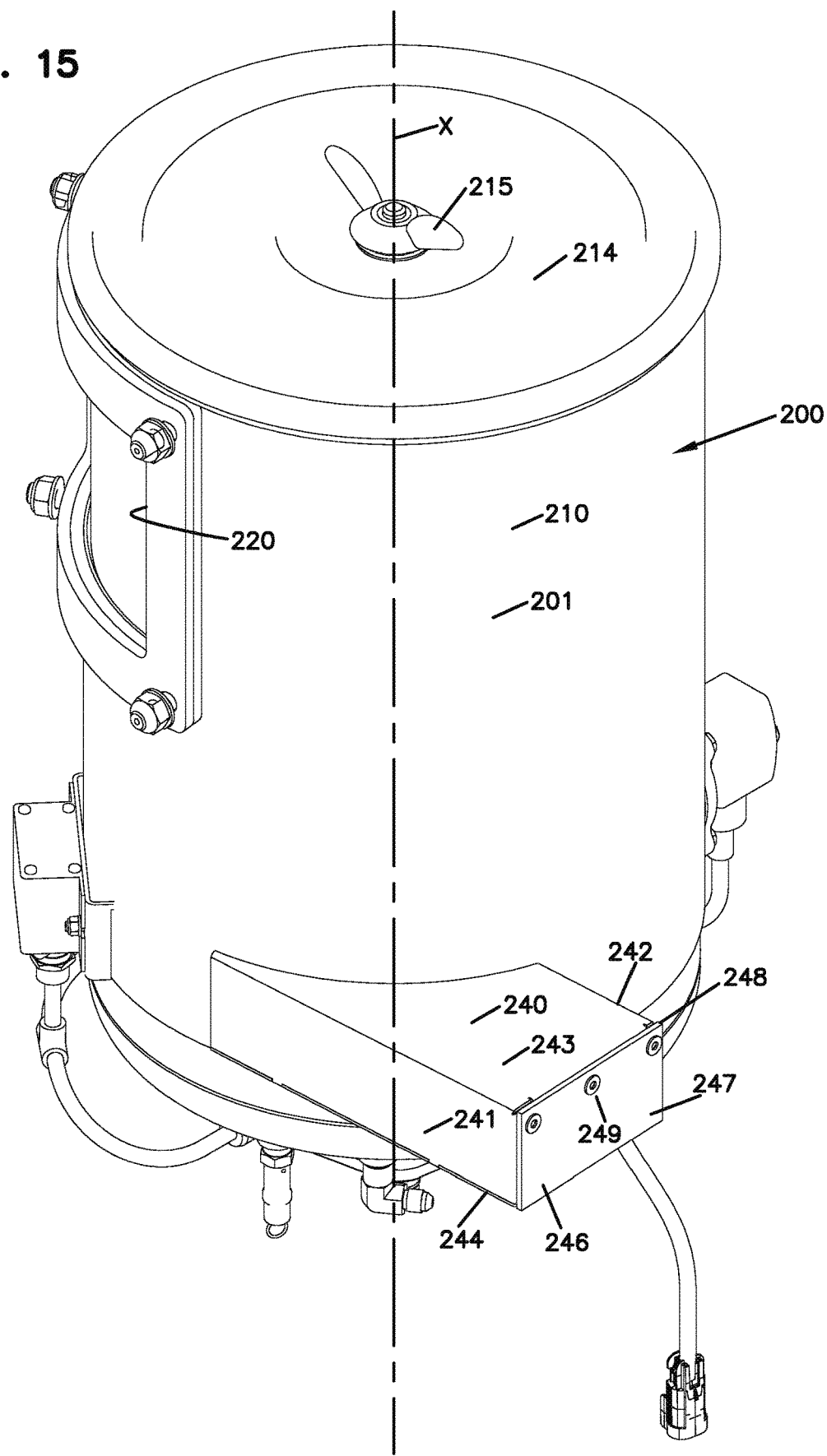
FIG. 15 is a schematic top end perspective view of a first alternate assembly configuration according to the present disclosure.

Attention is directed to FIG. 14, in which an example cartridge 50 is depicted. In FIG. 15, the cartridge 50 is depicted with a portion shown in cross-section.

As previously discussed, in connection with FIG. 7, the cartridge 50 comprises a media pack 51 extending around open interior 51i. The media pack 51 is positioned between outer liner 51x and inner liner 51y. For the particular cartridge 50 depicted, the media pack 51 comprises pleated media having alternating inner pleat tips 95 and outer pleat tips 96, FIG. 14.

A variety of media can be used for the media pack 51. The choice of media will be selected based on such concerns as cost; desired efficiency; desired lifetime of use; etc. Cellulose media can be used, as can synthetic media.

It is noted that, in general, a pulse jet cleaning arrangement as described herein, will often be used on equipment subject to high dust load environments, and high flow rate circumstances, i.e. a relatively high or high velocity flow of air and dust through the air cleaner in use. In instances where it is expected that the media pack may be subject to substantial air flow rates and dust flow, it may be desirable to provide enhanced media pack features protection of the media packs, from dust damage. One manner, in which the media pack can be protected against deterioration, would be to provide the media pack of synthetic media such as polyester media. Also, or alternatively, it may be desirable to protect the outer pleat tips 96 against abrasion from dust moving thereacross, as the air cleaner is operated. This can be done for example by coating the outer pleat tip 96 with a protective material, such as an acrylic. This can be a useful application whether the media is synthetic or cellulose.

In general, a non-flammable water based acrylic capable of either being air dried or heat cured can be used. The material will provide for abrasion and corrosion resistance to the media. The media pleats (which are form the outside pleat in the cartridge) can be coated by dipping or brushing with a tip coating of approximately ⅛ inch (3.2 mm) in depth (i.e. height).

Figure 13:
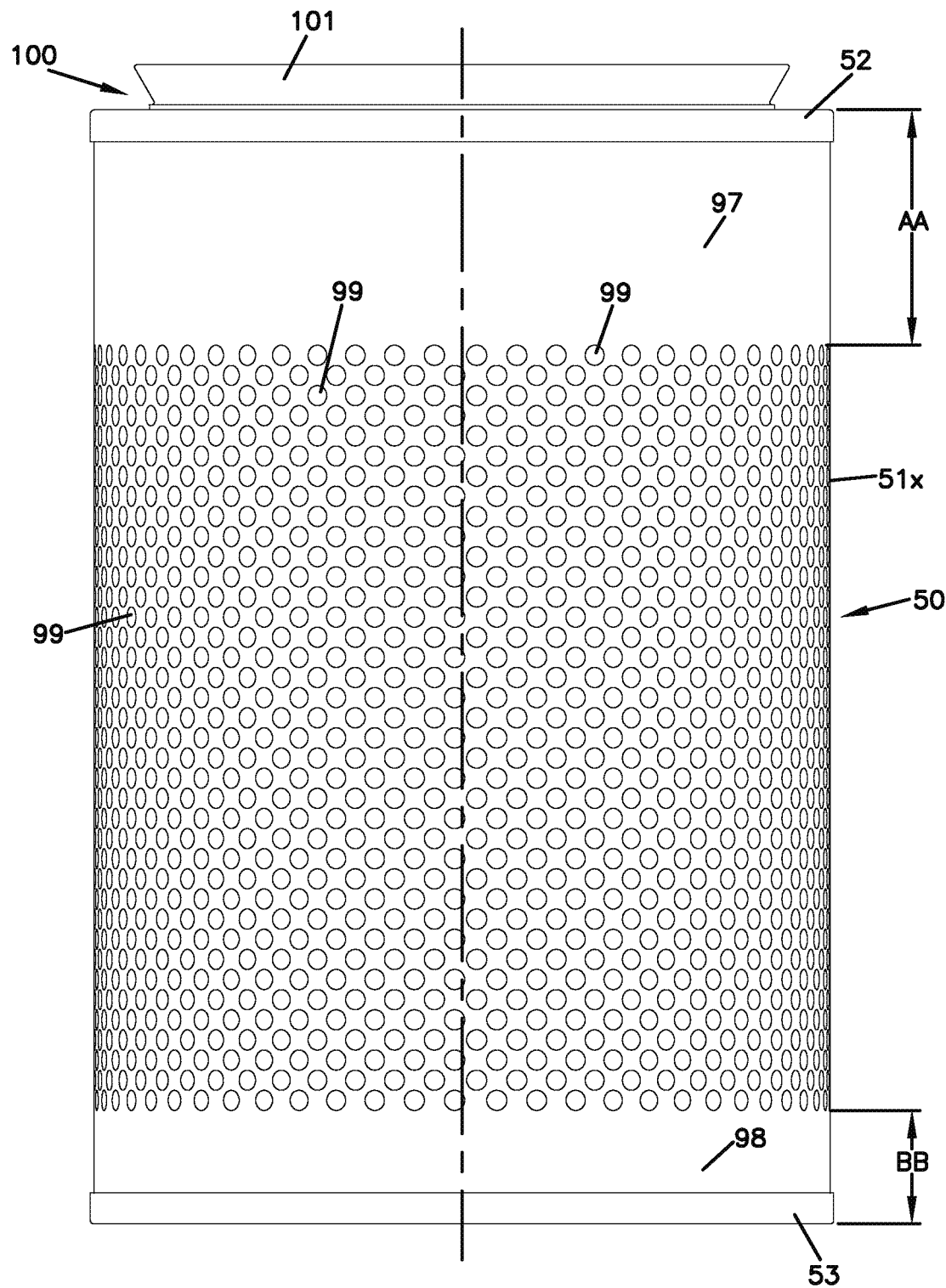
FIG. 13 is a schematic side elevational view of a filter cartridge usable in the air cleaner assembly of FIG. 1.

It can also be desirable to provide protection to the media pack, in the form of a barrier applied around the media pack 51, at one or more selected locations. An example of this is shown in FIG. 13. In particular, and referring to FIG. 12, the outer liner 51x depicted, includes imperforate barrier or margin 97 adjacent end cap or end piece 52 and a second imperforate barrier or margin 98 positioned against adjacent end cap 53. The margins or barriers 97, 98 are regions where the outer liner 51x is imperforate. Each extends over a distance of 1.0-4.0 inches (25.4-102 mm) axially along the outside of the end cap. Region 98 would, for example, be overlapped where air entered through inlet 48r of the air cleaner; and, region 97 would overlap, for example, where air exits through the dust egress arrangement 41. Both are regions where substantial dust contact with the media would otherwise occur, which can damage the media.

For the particular example arrangement depicted, FIG. 13, region 97 is generally axially longer than region 98, typically at least 0.75 inch (19 mm) longer and usually at least 1.25 inch (31.8 mm) longer.

For the example depicted, dimension AA is 3.0 inch (76.2 mm) and dimension BB is 1.5 inch (38.1 mm) although alternatives are possible.

Still referring to FIG. 13, the particular cartridge depicted is provided with a margin 97, 98, by providing the outer liner 51x on the form of a perforate metal cylinder, with perforations 99 therethrough, at appropriate locations, leaving the margins 97, 98. Alternatively, an expanded metal liner can be used, with shields positioned adjacent one or more of the end pieces 52, 53.

Referring to FIG. 14, it is noted that the inner liner 51y is depicted as an expanded metal liner, although alternatives are possible.

Referring to FIG. 7 cartridge 50 is depicted with adhesive coils or beads 51a, 51b extending around an exterior and interior of the media 51. These can provide for media integrity and pleat spacing. Such beads are not shown in the depictions of FIGS. 13 and 14, but can be included with features thereof.

It is noted that to facilitate dust cleaning, the media can be provided with a fine fiber thereon, such as described in U.S. Pat. Nos. 7,270,693 and 6,994,742, incorporated herein by reference. Such media helps ensure good surface loading and high efficiency, and also facilitates cleaning the dust off the cartridge during pulsing.

In FIG. 14, attention is directed to housing seal arrangement 100. The housing seal arrangement 100 generally comprises an axial seal member 101, positioned to provide seal under pressure directed in the general direction of axis X. Such sealing can be understood for example by referring to FIG. 7, in which the seal member is shown biased against portion of housing 2 (in this instance a portion of tank 31) by bolt or fastener 104. Referring again to FIG. 14, the housing seal arrangement 100 depicted, includes an axial seal ring 101 and a flexible lip or flange 102. Such a seal, for example, can be preformed and then be secured to end piece 52. A typical seal material would comprise, for example: Neoprene; EPDM rubber; Neoprene-EPDM; urethane, or a variety of alternative commercially available seal materials.

IV. Some Selected Alternatives, FIGS. 15-19

It is noted that the principles described herein can be configured in a variety of alternative configurations. Examples of some possible alternative configurations will be understood by reference to FIGS. 15-19.

A. An Assembly Configured for Vertical Orientation, FIG. 15

Attention is first directed to FIG. 15, in which assembly 200 is depicted. The assembly 200 comprises a housing 201 having a sidewall 210 with a central axis X extending generally vertically. Access cover 214, secured in place by nut 215, can be seen. In general housing 210 includes inlet arrangement 220 positioned at an end of sidewall 210 adjacent access cover 214 and sized and configured generally analogously to inlet arrangement 18, FIGS. 1 and 2.

At 240 a dust receiver is depicted, comprising first and second, opposite, sidewall sections 241, 242, each extending generally analogously to sections 42t, 42b (FIG. 11) but positioned as sidewall sections, rather than as top and bottom wall sections. The opposite top and bottom wall sections are indicated generally at 243, 244, respectively. Valve arrangement 246 for dust ejection, generally comprising a flap valve 247 secured along edge 248 by retainer arrangement 249, is depicted. In this example, securement is again along an uppermost edge, but in this instance, the edge extends between the tangential sections 241, 242 rather than along one of them.

Other features of the assembly 200 may be generally as previously described except now oriented in the vertical orientation shown. Thus, in housing sidewall 210, covered by dust receiver 240, is positioned an aperture arrangement (dust egress arrangement) analogous to dust egress arrangement 41, except oriented in a radial arc around central axis X which is extending vertically than horizontally. The optional scoop or direction arrangement 85 described above can be used for the assembly in FIG. 14, as can other features and configurations described.

B. Alternate Dust Egress Direction, FIG. 16.

Figure 16:
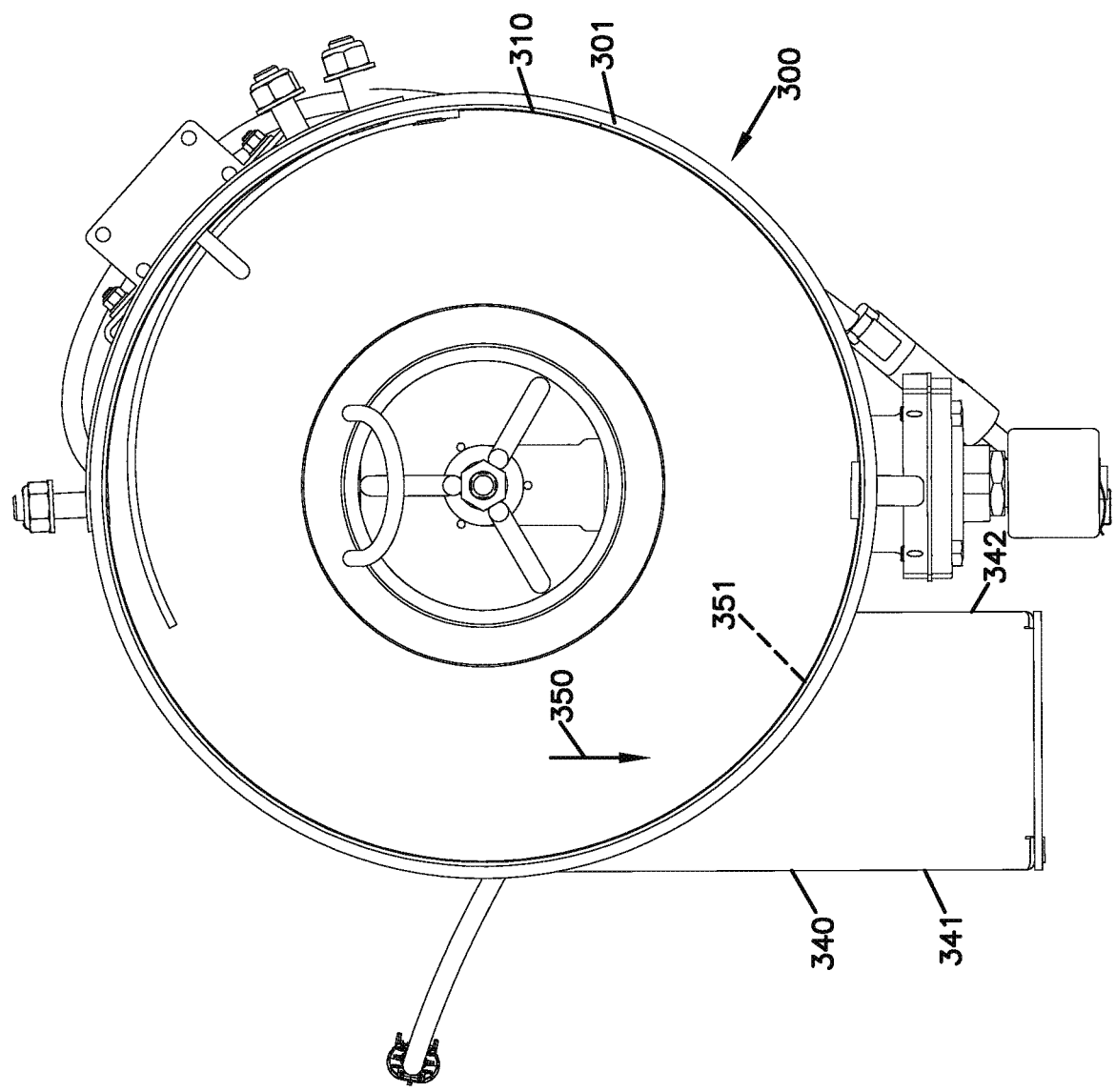
FIG. 16 is an end elevational view of a second alternate assembly configuration usable in accord with the present disclosure.

Attention is now directed to FIG. 16, a view generally analogous to FIG. 5, except shown with different dust egress direction, and thus dust egress aperture arrangement location and dust receiver direction. In FIG. 16, assembly 300 comprises a housing 301 with a sidewall 310. A dust receiver housing is indicated generally at 340 having opposite sidewall sections 341, 342, of which section 341 generally tangential to the sidewall 310, and each of which is directed downwardly. Thus, a dust egress direction from within housing 301, indicated generally by arrow 350, would extend through a dust egress aperture arrangement located generally where indicator 351 is provided. It could otherwise be analogous to aperture arrangement 41, FIG. 6, and could use the optional director or scoop arrangement indicated generally at 85, FIG. 12. Other features for the housing 301 can as generally described in connection with FIGS. 1-14 and are numbered accordingly.

C. A Dust Shield positioned within the Housing, FIG. 17

Figure 17:
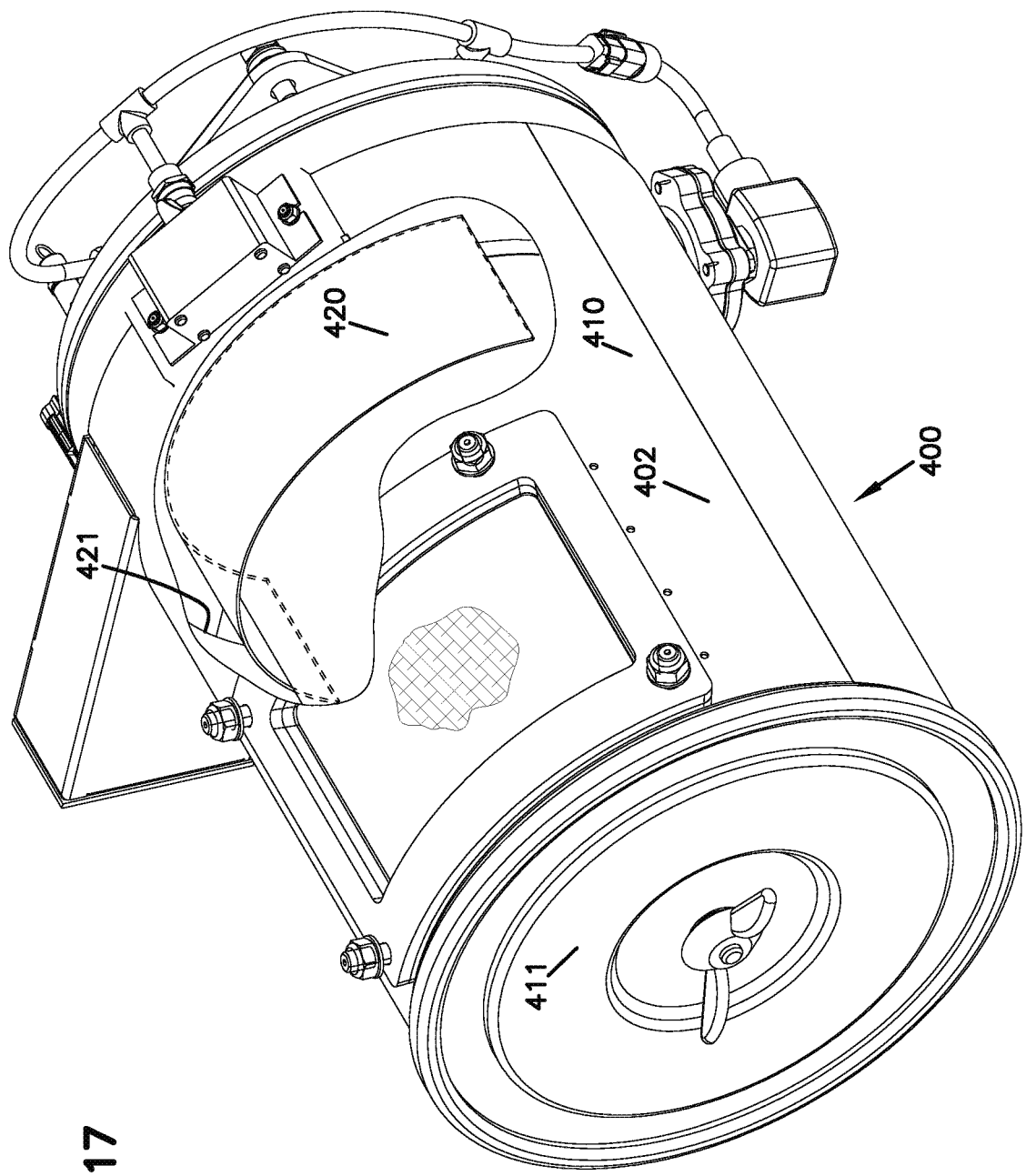
FIG. 17 is a schematic perspective view of a third alternate assembly configuration in accord with the present disclosure.

It is noted that protection of an interiorly received filter cartridge from accelerated deterioration due to dust impact, can be managed in a variety of ways. In FIG. 17, an optional feature to facilitate this is demonstrated. Referring to FIG. 17, assembly 400 is depicted comprising housing 402 including sidewall 410 and access cover 411. The assembly 400 can include features as previously described, for example in connection with any of FIGS. 1-16, if desired. The example depicted, includes many features analogous to the assembly 1 of FIGS. 1-14.

In FIG. 17, assembly 400 is shown with a portion of sidewall 410t broken away to shown internal detail. At 420, an internal shield is depicted. The shield 420 which can be secured within the housing around all of, of a portion of, an internally received cartridge, is shown adjacent to, and an overlapping orientation with, a dust egress aperture arrangement indicated generally at 421 and which can be generally analogous to dust egress aperture arrangement 41, previously discussed. The shield 420 can extend partially around an internally received cartridge or entirely around a received cartridge. The particular shield 420 depicted will help protect the cartridge from dust moving through egress aperture arrangement 421.

It is noted that the shield 420 of assembly 400 can be used in cooperation with a vertically oriented unit if desired, further it can be used in association with various ones of the features and options discussed herein.

It is noted that when a dust shield as part of a housing is used in coordination with the assembly in accord with principles described herein, it may be useful and/or desirable to provide a cartridge that does not have margin (i.e. protective shield portion) thereon adjacent the end cap having a housing seal arrangement thereon. Thus, for example a margin indicated at 97, FIG. 13, can be avoided.

D. An Example Dust Director, FIGS. 18-19

Herein above, a description of a technique used to induce cyclonic movement of air and dust around the cartridge 51 was described. The particular technique described involved providing generally tangential inlet air flow as a result of combination of inlet valve/director 60, FIG. 4A; and, the direction of the inlet arrangement 18 and inlet duct 18x, FIG. 1. Alternate or additional features and techniques can be used. An example is provided in connection with FIGS. 18 and 19.

Figure 18:
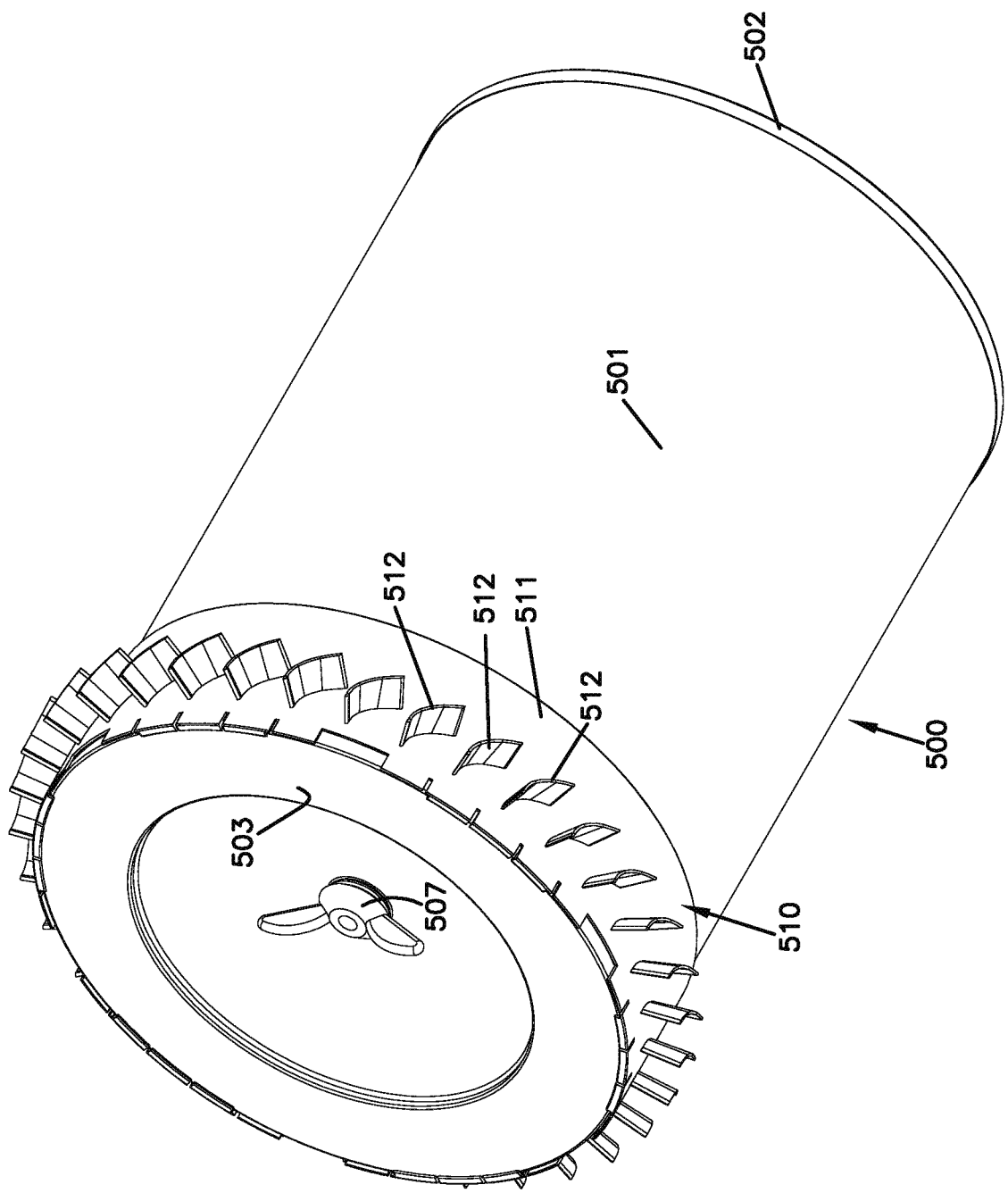
FIG. 18 is a schematic perspective view of an alternate filter cartridge usable in selected modified arrangements in accord with the present disclosure.

Referring to FIG. 18, cartridge 500 is depicted comprising a media pack 501 extending between opposite end caps 502, 503. End cap 502 can be generally analogous to open end cap 52, FIG. 13, and have an analogous seal member thereon. End cap 503 can be analogous to end cap 53, FIG. 13. In the example cartridge 500 depicted, fastener 507, which operates analogously to fastener 104, is provided rotatably, loosely, secured to the end cap 503.

Adjacent end cap 503 is provided an air flow director arrangement 510 comprising a mount 511 having a plurality of air flow director vanes 512 thereon.

The air flow director arrangement 510 is positioned around a portion of the cartridge 500 that is positioned (or potentially positioned, depending on rotational alignment) overlapped by an inlet arrangement for gas flow into the housing, in use. As the air is drawn into the housing, it will pass through the director arrangement 510 and will be directed by the vane 512 into a circular or cyclonic pattern around the cartridge 500. For the particular cartridge 500 depicted in FIG. 18, this would be a clockwise flow, when viewed in the direction of end cap 503. Of course, an opposite counter-clockwise flow can be induced, by using alternately directed vanes 512. A cartridge analogous to cartridge 500 can be used in an air cleaner assembly having features generally analogous to those previously described herein. Of course, if cartridge 500 was used in some of the previous assemblies as specifically depicted, it would need to be modified for "counter-clockwise flow" when viewed in the direction of end cap 503, to facilitate a proper dust rotation direction within the housing, for the particular dust egress aperture arrangements depicted.

Figure 19:
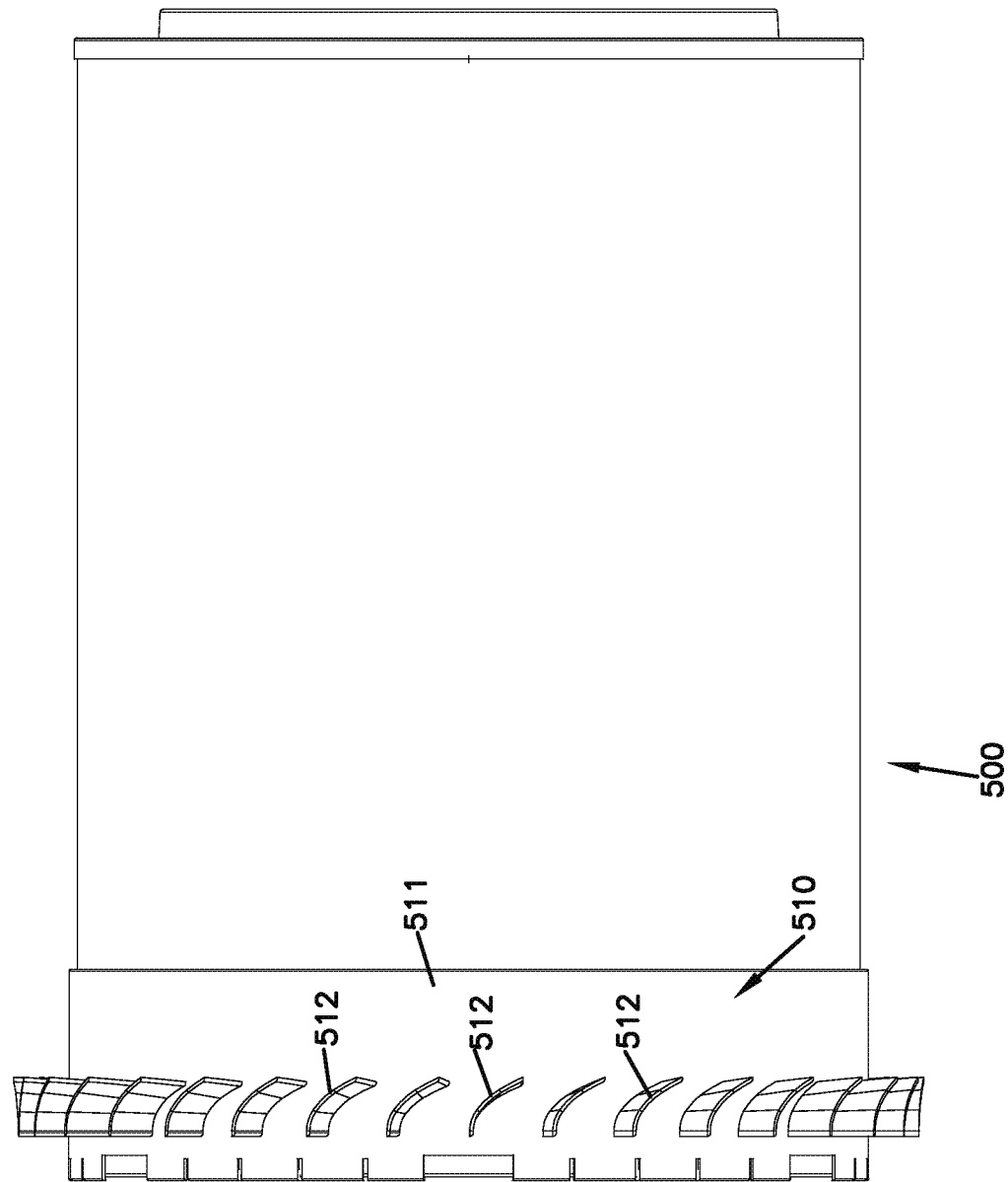
FIG. 19 is a schematic side elevational view of a filter cartridge of FIG. 18.

Referring to FIG. 19, a side elevational view of cartridge 500 is depicted.

V. Pulse Jet Features; Compressor Size Issues; Pulse Jet Operation (Control) Logic A. Pulse Jet System Features As previously discussed, air cleaner assemblies according to the present disclosure generally are pulse jet air cleaner assemblies; i.e. they include equipment configured for directing a pulse jet of air, as a pulse jet or cleaning flow, through a filter cartridge received therein, generally in a direction opposite normal filtering flow. Some general, adaptable, features relating to pulse jet air cleaner operation, are described in selected ones of the references discussed previously. In this section, a general characterization of some usable selected pulse jet features is provided.

Attention is first directed to FIG. 7. In general, air cleaner assemblies in accord with the present techniques, will include a pulse jet distribution arrangement 600 therein. The pulse jet distribution arrangement 600 will typically at least include a pulse jet flow tube 601 configured to direct a pulse flow of gas through an interior thereof, from a region exterior of the cartridge 50, into the open filter interior 51i of the cartridge 50. The tube 601 may terminate short of entering the cartridge 50, or it may extend into the cartridge 50, depending on the system.

Still referring to FIG. 7, the particular pulse jet distribution arrangement 600 depicted includes, positioned against an exit end 610 of tube 601, a pulse distributor member 605. The example pulse distributor member 605 is a conical splitter oriented spaced from, and in overlap with, end 601. As gases of a pulse impact peak 605p, of distributor 605, they will generally be directed radially outwardly, in a somewhat conical pattern. The splitter 605 is shown mounted to tube 601, by support 606. A conical spreading of the pulse by splitter 605 can facilitate cleaning of the cartridge 50, along its axial length.

Still referring to FIG. 7, the assembly 1 depicted includes an outlet tube 621 which extends into the cartridge interior 51i, through central air flow aperture 52o in end cap 52. The outlet tube 621 ends at an outwardly flared end 621f, at the end most toward end cap 53. The tube 621 facilitates desirable pulse distribution within cartridge 51, especially to help ensure that portions of the cartridge 50 most adjacent end cap 53 are adequately pulsed or cleaned.

In general terms, outlet tube 621 is an exit tube for filtered air, from cartridge 50 to be directed to outlet 21. Typically, tube 621 is non-porous and generally circular in configuration, although alternatives are possible.

An outlet tube analogous to tube 621 is discussed at length in WO 2007/149388, previously incorporated herein by reference.

Typically, an interior diameter of end 610 of tube 601 (or largest cross-sectional dimension, if not circular) is no more than 40%, typically no more than 35%, and usually 15-30% of an internal diameter (largest cross-section if not circular) of tube 621 in region surrounding the outlet 610.

Further, typically the tube 621 projects into cartridge 50, through aperture 52o, a distance extending at least 35%, usually at least 40% and typically 40-60%, inclusive, of an axial length of the cartridge 50 between end caps 52, 53, although alternatives are possible.

Typically, the open end 610 of the tube 601 has a cross-sectional area of no more than about 16% of a cross-sectional area defined by and immediately surrounding portion of tube 621. Typically the open area of tube 610 is no more than 12%, and usually within the range of 2-9%, of the open area of a portion of tube 621 surrounding it.

Typically, an exterior diameter of the outlet 621, (discounting flare 621f) is no more than 80%, of an internal diameter of cartridge open area 51i. typically the outer diameter of tube 621 is at least 65% of the diameter of interior region 51y (when the tube 621 and/or the interiors 51i are not circular, typically the reference is meant to largest cross-sectional dimension).

Still referring to FIG. 7, it is noted that the conical distributor 605 defines, around peak 605p, a conical angle. Typically, that angle is at least 40°, and usually not more than 80°, typically 50°-70°. An example arrangement is depicted in FIG. 7, has a conical angle of about 60°.

Still referring to FIG. 7, at 8 a conical angle between ends 610 of tube 601 and end 621e of tube 61 (discounting flare 621f) is defined. Typically angle H is no more than 30°, often no more than 27°, and sometimes not more than 25°. In a typical example, although alternatives are possible, angle H will be at least 20°, typically at least 22°.

Referring again to FIG. 7, the particular assembly 1 depicted, includes an accumulator tank or compressed gas tank 31 positioned secured to housing 2, at an end 2e of the housing 2. In the example depicted, tank 31, is in part, surrounded by sidewall 10. The tank 31, for the example depicted, has a donut or tube shape, and is positioned around an open interior 31x, which serves as a portion of an outlet aperture for filtered gas flow from housing 2. The tube 601 brings a pulse from valve arrangement 35 through tank 31 into aperture 31x and then around bend 601b, toward interior 51i. Thus, the valve arrangement 35 provides for a pulsing of gas contained within tank 31 through 601 into cartridge interior 51i.

It is noted that many techniques as described herein can be applied in systems which do not have a compressed gas tank (accumulator tank) analogous to tank 31 positioned in (i.e. secured to) the housing 2, for example at an end of the housing sidewall 10. For example, tank 31 can be alternately located, or the air cleaner assembly 1 can be provided without such a tank, but with equipment that can be attached to ducting (tubing) from a remote tank (such as a tank on a vehicle or other equipment with which the assembly would be used) that serves a an additional purpose.

Referring now to FIG. 8, a view taken through aperture 21 and aperture 31x, a portion of tube 601 adjacent bend 601b can be seen.

Referring back to FIG. 1, controller 32 includes appropriate processor memory capabilities, (control card) that are programmed in accord with the preferred pulse control logic, for example as described herein to provide for a monitoring of restriction condition ($R_c$) as described (tank pressure if needed) and initiation of the pulse valve assembly 35 as described. A control unit 32 including such features can be implemented with hardware and/or software components, in accord with conventional, commercially available, technology. Such equipment and programming features are within the skill of one of skill in the art of microprocessor provision and programming.

B. Compressor Size/Type

For a typical pulse jet cleaner system in accord with the principles described herein, compressed gas pressure used in a pulse is typically 100 psi (6.89 Bars), and each pulse generally requires one cubic foot (0.028 cu. meter) of air. Herein, in this context, the reference to "one cubic foot of air" is meant to approximate a cubic foot of air in standard condition (which would then be compressed in a tank to a smaller volume).

In general, pulse jet cleaning systems can be provided in two overall forms. In a first, a relatively small compressor system is provided on the vehicle or other equipment generally dedicated to the pulse jet system involved. When this is the case, the compressor will typically be relatively small, typically under 1 horsepower (hp), an example being a ¼ horsepower (hp) compressor with an output of 1 cu. ft./min at 100 psi. Such systems may take a significant period of time, for example about to 50-90 sec. to charge a compressed air tank for providing pulse jet operation, between each pulse. In a second, a large onboard compressor system that is used for other systems on the vehicle, for example the brake system, may be present; an example being a 1-5 horsepower (hp) compressor capable of providing 10 cfm at 100 psi. When this is the case, the compressor system can be used to provide compressed gas for operating the pulse jet system. Such relatively large compressor systems, are generally capable of providing pulsing without substantial delay (for example more than 15 seconds) between each pulse, if desired.

Indeed, a 10 cubic ft/min compressor would be capable of providing up to one pulse every six (6) seconds. However, such an operation would typically require the full capacity of the compressor. Thus, in many systems in accord with the present disclosure in which a large on board compressor is provided, generally more than a six second delay between pulses is provided. On other hand a relatively small, for example ¼ horsepower compressor, would typically require at least a full minute to recharge the tank, after a pulse.

In general terms, when a relatively small compressor is used, it may be desirable to provide for either or both of: a selected time period between pulses of a multiple pulse event; and, a monitoring system to check compressor tank (i.e. accumulator tank) pressure, before a pulse is initiated.

On the other hand, when a relatively large compressor system is available, the circumstances may allow an assumption that the system is appropriately charged for providing pulsing, at nearly any given time. In this situation, it may not be necessary to include as part of the pulse jet control logic any monitoring of the tank compressor, as part of a decision with respect to pulsing. Also, relatively short periods of time between pulse events and/or individual pulsing may be acceptable.

Herein examples are described, for various ones of these types of systems. From the examples, and the general control logic discussed, general principles will be understood.

C. Pulse Jet Operation Logic

Various pulse jet operation logic approaches can be applied, for implementation of pulse jet operations in accord with the principles described herein. These approaches include ones described in the various publications referenced herein above and incorporated by reference. However, some advantageous logic approaches have been developed. These are characterized herein, generally, as being progressive pulsing systems. By the term "progressive" it is meant that the control logic modifies some aspect of the pulsing, depending on the circumstances encountered in the field. That is, there are not simply "pulse on" or "pulse off" circumstances, but rather there are modifications in what occurs when the pulsing is on and/or when the pulsing is selected to become on at some point.

Herein, distinctions are made between definitions of a "pulse" and a "pulse event." A pulse is a single operation of a valve system, to cause a compressed gas pulse to be directed into an interior of a filter of an air cleaner assembly in accord with the present disclosure. A "pulse event" is a set of one or more individual pulses conducted in accord with defined parameters.

One of the variables that relates to the pulsing control logic is the amount of pulsing in a pulse event, generally referred to herein by the designator "A." The amount of pulsing (A) can be a function of: a pre-selected number (Q)

of individual pulses; or, providing individual pulses over a selected period of time (N), for example with a selected interval (M) between pulses. Variations in: (a) the preselected amount of pulsing (Q), or, (b) the time period (N) of pulsing and/or interval (M) between individual pulses, can be used to provide different amounts of pulsing (A) under different circumstances, i.e. in different (or progressive) pulse events.

In general terms, whether or not pulsing activity is to be initiated at a given point, in part will typically be a controlled function of a restriction condition ($R_c$) of the air cleaner system. The restriction condition ($R_c$) is generally reflective of an amount of restriction provided to air flow through the air cleaner assembly, by a filter cartridge within the assembly. Variation in the restriction condition ($R_c$) for a given air cleaner assembly and engine system is a function of: engine draw (i.e. RPM) and, amount of dust load on the cartridge. In general, a relative increase in either or both of engine RPM and dust load leads to an increased restriction condition ($R_c$).

In general, then, the restriction condition ($R_c$) can be monitored (assessed) either directly or indirectly. Indirect monitoring, for example, would be by monitoring engine RPM. Direct monitoring, for example, would be by measuring a pressure differential ($\Delta P$) between: (1) a location within the air cleaner or air cleaner system downstream of a filter cartridge; and, (2) another location, for example the atmosphere or a location within the assembly but upstream of the filter cartridge. In a typical system, the Restriction Condition ($R_c$) is monitored by measuring a pressure differential between a location downstream of the filter cartridge (within the air cleaner assembly or duct work downstream of the air cleaner assembly) and a location exterior of the air cleaner, i.e. and atmospheric pressure.

Examples of progressive pulse control logic and methods of operating a pulse jet air cleaner assembly in accord with progressive pulse control logic can preferably be defined in accord with the above principles. For example: (1) for a pulse jet air cleaner assembly that includes a cartridge positioned within a housing; (2) and, operation that generally involves: directing inlet flow of air to be filtered into the housing; and, filtering the air by passage through the filter cartridge in a filtering flow direction; (3) pulse jet operation generally involves directing a cleaning pulse flow through the filter cartridge in a direction generally opposite the filtering flow direction. In general terms herein, a "cleaning pulse flow", i.e. a pulse event, can be one or more individual pulses and will typically comprise a plurality of pulses. (It is noted that in a system as described in which the air cleaner assembly includes an inlet flow valve arrangement such as an inlet flap valve 60 described above, as cleaning pulse flow occurs, filtering flow maybe momentarily inhibited).

In general, as an example of progressive pulse control logic programming, such a system can be operated with a pulse control logic such that the cleaning pulse flow is provided accord with a pulse control logic in which:

(1) When a restriction condition ($R_c$) reaches a level of at least W, pulsing is conducted for a selected amount $A_2$, when next Rc drops to $Z_2$ or less, wherein $Z_2$ is less than W (i.e. $Z_2<W$); and, (2) If a restriction condition ($R_c$) of at least W is not reached within a selected time period T, pulsing is nevertheless conducted for a selected amount $A_1$; for example when $R_c$ next drops to $Z_1$, or less; as an example wherein $A_1$ is less than $A_2$ (i.e. $A_1<A_2$).

In other words, for a system with the control logic outlined above, a restriction condition ($R_c$) is monitored.

That restriction condition ($R_c$) can be (for example) an indirect measurement (engine RPM) or a direct measurement (pressure differential, $\Delta P$). In either case, the control logic can be a program which provides that, if (when) the restriction condition ($R_c$) reaches some defined level W, pulsing will start after W is reached, but only when next $R_c$ next drops to some defined level ($Z_2$) or less. Further, the system is programmed so that if a sufficient period of time (T) passes and a restriction condition W has not been reached (which would trigger the pulsing event or at least the potential for a pulsing event) the system would nevertheless start pulsing for a selected amount $A_1$, when next a selected Restriction Condition ($R_c$) of $Z_1$ or less is reached. Here, the progression can, in part, provided by having the amounts $A_1$ and $A_2$ differ, for example with $A_2>A_1$, although alternatives are possible. In the specific defined example, the amount $A_1$ is greater than $A_2$. This is logical since the amount $A_2$ would not be triggered unless restriction has been observed to have been raised to W, indicative of greater dust flow into or through the cartridge as represented by either: increase in restriction provided by the cartridge, or increased engine draw.

Of course, the amount of pulsing ($A_1$, $A_2$): (a) can be pre-selected in a system that allows for a selected amount or number (Q) of pulses; or, (b) it can be controlled by a controlled total time period (N) of pulsing, for example with a selected time interval (M) between pulses.

As an example, the timer could be initiated when the engine starts to run, and if defined pressure limits having been reached, the cleaning cycle in accord with (2) can be initiated, for three minutes. However, this cycle would not involve pulsing until a reading at or below a specified pressure ($Z_1$) is reached, for a typical system. After the preconditioned pressure ($Z_1$) is reached, and the three minutes of pulsing occurs, the control logic will then restart the timing again, so that after an hour of operation, the pulsing in accord with (2) will again be initiated (once the precondition ($Z_1$) of the low pressure is reached) unless in the intervening hour the restriction condition ($R_c$) leading to (1) described above is reached.

Typically, the system will be configured so that should the pressure rise to above the selected control limit, ($Z_1$ for (2) and $Z_2$ for (1)) while the pulsing event is occurring, the pulses will stop, with the pulse event completed once the pressure ($R_c$) again drops below the defined amount ($Z_1$ or $Z_2$).

The progressive logic can be extended to define still further pulse events. For example, the same system defined above, could also be programmed so that a cleaning pulse flow is conducted in accord with a pulse control logic further wherein:

(3) When (if) a Restriction Condition ($R_c$) reaches a level of at least X, pulsing is conducted for an amount $A_3$ when next Rc drops to $Z_3$ or less. For example, this might be conducted in accord with programming wherein $Z_3$ is less than X ($Z_3<X$), X is greater than W (X>W); and, $A_3$ is greater than $A_2$, ($A_3>A_2$), although alternatives are possible.

Again, typically if a pulsing event in accord with (3) is initiated as a result of the restriction condition ($R_c$) having reached $Z_3$ or less, should the restriction condition ($R_c$) raise above $Z_3$ while a pulsing is occurring, the system can be programmed to stop pulsing and to complete the pulsing event once the restriction condition ($R_c$) is measured as having dropped to or below $Z_3$.

In general terms, a restriction condition (Rc) of X would be indication of even greater dust load occurring, and thus a preference for greater pulsing to provide cleaning effect and to return the air cleaner to a more desired level of operation.

It is anticipated that pulse control logic programming will be preferred to be such that in some instances, once the restriction condition ($R_c$) has been measured as reaching some defined level, for example it has at least reached level "Y", pulsing should be conducted without waiting for the restriction condition (Rc) to drop below some defined level. Thus, the progressive pulse control logic could be such that in such a situation the cleaning pulse is conducted in accord with the pulse control logic further wherein:

(4) When (if) the restriction condition (Rc) reaches a level at least Y, pulsing is conducted for an amount $A_4$. Typically, this would be a situation in which Y is greater than each of X and W (Y>X and Y>W).

When the control logic includes providing for a cleaning pulse if the restriction condition reaches some amount Y, without waiting for the restriction condition to drop below some level, as described in the previous paragraph at (4), in typical instances the programming will also include implementing follow-up pulsing in accord with conditions appropriate for at least a selected one of $A_2$ and $A_3$, for example as defined above at (2) and (3).

Typically when this latter occurs, the pulsing event is immediately started in accord with a selected one of (2) and (3) after the pulsing $A_4$ is completed, and once the precondition of restriction condition ($R_c$) ($Z_2$ or $Z_3$ respectively) is met, without necessarily seeing an intervening level of X or Y respectively, met.

In general terms, then, step (4) outlined above is a progression which leads to immediate pulsing should the restriction condition ($R_c$) reach some relatively high defined level. It also provides for a follow-up step down, when the option outlined in the previous paragraph is used, since in such a situation, the relatively dusty environment and/or cartridge will have occurred.

An example of progressive control logic system which uses each of the above principles then can be defined a system having Tiers (levels) as follows:

Tier 0: Pulse an amount A1 every time period T, when the Restriction Condition ($R_c$) is no greater than $Z_1$ provided the conditions of Tier 1, 2 and 3 do not implement.

Tier 1: If the Restriction Condition ($R_c$) reaches W, but does not reach X, when the restriction condition ($R_c$) next drops to $Z_2$ or below, pulse for an amount $A_2$.

Tier 2: If the Restriction Condition ($R_c$) reaches X, but does not reach Y, when the Restriction Condition ($R_c$) next drops to $Z_3$ or below, pulse for an amount $A_3$.

Tier 3: If the Restriction Condition ($R_c$) reaches Y; pulse for an amount $A_4$, without waiting for a drop in the Restriction Condition ($R_c$); and, then, after pulsing for an amount $A_4$, implement a Tier 2 type pulse event; i.e. when the Restriction Condition (Rc) next drops below $Z_3$, pulse for an amount $A_3$.

In each of the Tiers, when a pulse event is conditioned upon a selected restriction condition ($R_c$) (i.e. $Z_1$, $Z_2$, $Z_3$) at or below which the pressure must be reached, typically the control system will be programmed to pause pulsing, should, during the pulsing event, the restriction condition ($R_c$) increase above the control amount ($Z_1$, $Z_2$, $Z_3$), until the $R_c$ next drops to or below that control amount, at which point the pulsing event can be continued until completed. It is also noted that the programming can be selected so $Z_1$, $Z_2$, $Z_3$ are at levels below which the restriction condition ($R_c$) must be, before initiation of a pulsing event, rather than a level at or below which a restriction condition ($R_c$) must be. Herein, these alternatives are treated as equals, when the system is a defined above because only an algebraic variable ($Z_1$, etc) is used for the assigned level, as opposed to a specified numerical amount.

In the example, after the pulsing $A_4$ in Tier 3, the Tier 2 pulsing event is initiated without regard to whether restriction condition ($R_c$) again reaches X. Since Y is typically greater than X, it will be assumed by the control system that X has been reached, and pulsing will be conducted as long as the precondition of $R_c$ being below $Z_3$ is met.

In an example such system:
1. The Restriction Condition ($R_c$) can be a measured differential pressure ($\Delta P$) across the filter cartridge (i.e. between a location downstream of the cartridge and the atmosphere).
2. The amounts $A_1$, $A_2$, $A_3$, and $A_4$ can be managed with a selected time interval ($M_1$, $M_2$, $M_3$, $M_4$) between pulses, and with a selected time period ($N_1$, $N_2$, $N_3$, $N_4$) of each total pulse event. (For example, in Tier 0 pulse every 20 seconds ($M_1$) for a time ($N_1$) at 3 minutes in each hour (T).
3. Typically: W<X<Y
4. If desired, $Z_1=Z_2=Z_3$
5. Typically the time interval (M) between pulses in each of the Tiers will not be greater than 120 sec. Usually it will not be greater than 100 sec.
   (a) When a large onboard compressor is available, typically the time interval between pulses will not be greater than 70 seconds.
      (1) The time interval between pulses in each Tier can be the same, as an example 60 sec.
      (2) The time interval between pulses can be varied among the Tiers; for example: 20 seconds for Tier 0, 1 and 2; and, 60 seconds for Tier 3.
   (b) Typically with a large compressor it will not be necessary to check tank pressure between pulses.

Two specific examples of such systems would be as follows:

EXAMPLE A

Tier 0: Pulse for 3 minutes every hour when $\Delta P$ ($R_c$ as measured by restriction) drops below 6.5 inches $H_2O$, if pressure limits from Tier 1, 2 and 3 have not been reached.

Tier 1: If pressure reaches 24 inches $H_2O \leq \Delta P < 26$ inches $H_2O$), pulse for 6 minutes when $\Delta P$ next drops below 6.5 inches $H_2O$.

Tier 2: If pressure reaches 26 inches $H_2O \leq \Delta P < 28$ inches $H_2O$, pulse for 9 minutes when $\Delta P$ next drops below 6.5 inches $H_2O$.

Tier 3: If pressure is $\Delta P \geq 28$ inches $H_2O$, pulse for 21 minutes regardless of $\Delta P$; also at the end of the 21 minutes engage a Tier 2 cleaning cycle.

Pulse Interval: Every 20 seconds—Tier 0, 1 and 2; Every 60 seconds—Tier 3

EXAMPLE B

Tier 0: Pulse for 3 minutes out of every hour when $\Delta P$ drops below 5 inches $H_2O$, if pressure limits from Tier 1, 2 and 3 have not been reached.

Tier 1: If pressure reaches 16 inches $H_2O \leq \Delta P < 19$ inches $H_2O$, pulse for 6 minutes when $\Delta P$ next drops below 5 inches $H_2O$.

Tier 2: If pressure reaches 19 inches $H_2O \leq \Delta P < 22$ inches $H_2O$, pulse for 9 minutes when next $\Delta P$ drops below 5 inches of $H_2O$.

Tier 3: If pressure reaches $\Delta P \geq 22$ inches $H_2O$, pulse for 21 minutes regardless of $\Delta P$; and, at the end of the 21 minutes engage a Tier 2 cleaning cycle.

Pulse Interval: Every 60 seconds in each Tier.

It is noted that the systems described previously in this section (Examples A and B) were described without requiring a specific step of measuring or monitoring compressed gas tank (i.e. accumulator tank) pressure. Of course a step of measuring tank pressure could be used a any of the protocols defined, with pulsing not initiated unless and until a minimum tank pressure is measured. However, if the vehicle or equipment has a sufficiently large compressor system, the control logic can be programmed to implement independently of measurements of tank pressure, since it can be assumed that an adequate tank pressure to provide pulses is always present, if the time interval between pulses is adjusted. Indeed, in some instances, the pulse control logic approaches of examples A and B can be implemented in a system in which the air cleaner assembly does not include an accumulator tank or gas compression tank but rather in which the tank is positioned remotely, associated with the relatively large compressor and other compressed gas operating systems.

An example general approach for progressive pulse control logic in a situation, in which the accumulated tank pressure should be checked before pulsing, would be as follows:

Tier 0: Pulse an amount of $A_1$ every hour when $\Delta P$ drops below $Z_1$, inches $H_2O$, if pressure limits from Tier 1, 2 and 3 have not been reached and accumulator tank pressure is above 100 PSI.

Tier 1: If pressure reaches $W \leq \Delta P < X$ pulse an amount $A_2$ when $\Delta P$ next drops below $Z_2$ and accumulator tank pressure is above 100 PSI.

Tier 2: If pressure reaches $X \leq \Delta P < Y$, pulse for an amount $A_3$ when $\Delta P$ next drops below $Z_3$ and accumulator tank pressure is above 100 PSI.

Tier 3: If pressure is $\Delta P \geq Y$, pulse an amount $A_4$ regardless of $\Delta P$, if accumulator tank pressure is above 100 PSI; and, at the end of the $A_4$ pulsing engage a Tier 2 cleaning cycle.

In an example such system, $W < X < Y$; and, $A_1 < A_2 < A_3 < A_4$

In applications where a small compressor is used, the pulse interval (M) is normally determined by the time it takes the compressor to charge the air accumulator to the desired pulse pressure (typically 100 psi). When the air accumulator reaches a target pressure (typically 100 psi) a pressure switch (or other type of sensor such as a pressure transducer) on the air tank signals the control circuit to actuate a cleaning pulse. The actual time it takes to recharge the air tank is affected by such factors as the output capacity of the compressor used and the volume of the air tank. The types of compressors of low power typically used with systems of the type characterized herein would typically take between 30 and 90 sec to recharge the air tank. The condition of the compressor can also influence air tank recharge time (as the compressor wears, recharge time may become longer). A pressure switch is used to actuate a pulse in this manner to ensure that pulses always occur at the desired pressure and that cleaning pulses occur at the shortest interval possible (pulse occurs as soon as air tank reaches target pressure).

A specific example would be as follows:

EXAMPLE C

Tier 0: Pulse 3 times within each hour, when $\Delta P$ drops below 5 inches $H_2O$, if pressure limits from Tier 1, 2 and 3 have not been reached and accumulator tank pressure is above 100 psi.

Tier 1: If pressure reaches 16 inches $H_2O \leq \Delta P < 19$ inches $H_2O$, pulse for 6 minutes, when $\Delta P$ next drops below 5 inches $H_2O$ and accumulator tank pressure is above 100 psi.

Tier 2: If pressure reaches 19 inches $H_2O \leq \Delta 22$ inches $H_2O$, pulse for 9 minutes when $\Delta P$ nest drops below 5 inches $H_2O$ and accumulator tank pressure is above 100 PSI.

Tier 3: If pressure reaches $\Delta P \geq 22$ inches $H_2O$, pulse for 21 minutes regardless of $\Delta P$, if accumulator tank pressure is above 100 psi; and, at the end of the 21 minutes engage a Tier 2 cleaning cycle.

Pulse interval for each Tier: 60 seconds

B. Other Features

In WO 2007/149388 and U.S. 2009/0308034, some selected usable materials for valve arrangements are described. Analogous materials can be used for the valve arrangements described herein.

A variety of types of equipment can be fitted with an air cleaner assembly according to the present disclosure. A typical use would be on a military vehicle that is expected to traverse a wide variety of terrains (for example, including with water fording), and which is expected to be used under circumstances in which it is undesirable for occluded air cleaners to inhibit performance for any significant time.

The principles described herein can be used with a variety of equipment and a variety of rated air flows. Typical sizes will be with air cleaner diameter of 10 inches to 17 inches (254-432 mm), and rated air flows of 400 cfm to 1400 cfm (11.3-39.6 cu. meters/min), although alternatives are possible.

VI. Some General Comments

According to the present disclosure, features, assemblies, and techniques of operation, for an air cleaner assembly are provided. In an aspect of the present disclosure, an air cleaner assembly is provided which comprises an air cleaner housing having: an air flow inlet; an air flow outlet; and, an interior. The interior is generally sized and configured to operably receive therein a serviceable filter cartridge. The typical serviceable filter cartridge would be removable from the air cleaner housing, and would comprise a media pack surrounding the open filter interior. A typical media pack would comprise pleated media, comprising alternating inner and outer pleat tips, positioned in extension between first and second, opposite, end caps.

The housing includes an outer sidewall which surrounds a central longitudinal axis of the air cleaner housing. Selected features described herein can be applied when the air cleaner housing is oriented with the central axis extending generally horizontally; and, selected features described herein can be applied when the air cleaner housing is oriented with the central axis extending generally vertically.

Typically, the housing has an outer sidewall which extends around the central longitudinal axis, and is tubular in configuration. The outer sidewall in a typical application will have (define) a generally circular cross-section.

The housing includes a dust ejection port arrangement therein. The dust ejection port arrangement includes a dust egress aperture arrangement in, i.e. through, the outer sidewall. The dust egress aperture arrangement can comprise a single aperture or plurality of apertures.

A typical assembly includes a pulse jet distribution arrangement. The reference in this context to a "pulse jet distribution arrangement" is merely meant to refer to a housing which has adequate features to allow for a pulse jet flow to be directed into an internally received filter cartridge, in a direction opposite normal filtering flow. When the cartridge comprises media surrounding an open filter interior, this will typically comprise features adequate to direct pulse jet flow into the interior of the cartridge and then through the media of the cartridge. The pulse jet distribution arrangement can, for example, comprise a pulse jet flow tube, oriented to direct the flow into the cartridge. It can include additional features such as a distributor end or nozzle, and indeed the air cleaner assembly can include an accumulator tank and various pulse jet valve and pulse jet valve control assemblies, if desired.

In a certain example arrangements described herein, the dust ejection port arrangement comprises a dust egress aperture arrangement on the outer sidewall that extends over a radial arc of at least 20°, typically at least 30°, often at least 45°, usually no more than 120°, typically no more than 110° and often within the range of 45°-90°, inclusive. The term "radial arc" in reference to the dust ejection port arrangement is meant to refer to an arcuate distance along the housing outer sidewall, measured as an arc around the central longitudinal axis, between radially most extreme edges or portion of the dust egress aperture arrangement. When the dust egress aperture arrangement comprises a single aperture, this would be the radial arc between most opposite ends of the arc. When the dust egress aperture arrangement comprises more than one aperture, it may analogously be a distance between furthest radially remote edge regions, of furthest radially remote apertures in the dust egress aperture arrangement.

In a typical system, a dust receiver is a housing positioned exteriorly of the air cleaner housing, orientated to receive dust (from the dust egress aperture arrangement) directed into on interior of the dust receiver housing.

Typically, the air cleaner assembly defines (provides) a dust rotation direction. This is generally meant to refer to a direction around the cartridge (between the filter cartridge and the sidewall) into which air and dust directed into the housing is generally directed to flow or spiral. It provides for a cyclonic cleaning effect as a pre-separation of dust within the assembly. The term "dust rotation direction", then, is meant to refer to this spiraling direction. Generally, two directions are available: clockwise and counter-clockwise, given a specific orientation of observation. The spiraling or dust rotation direction will typically be defined by various features in the housing including, as possibilities: a direction of inlet flow into the housing; a valve/director arrangement used within the housing; and/or a vane arrangement positioned in the housing and/or positioned on the filter cartridge. Examples of these are described.

In an example described herein, the housing includes a radially inwardly directed scoop (or deflector) edge at an edge of the dust egress aperture arrangement most radially downstream with respect to the dust rotation direction. This would be, then, a scoop or collector edge which helps collect dust as it passes over or across the dust egress aperture arrangement in the housing sidewall, when moving in the dust rotation direction. A typical such scoop or collector comprises an inwardly deflected portion of the housing sidewall, or an extra member secured to an inside of the housing sidewall.

In an example system described, the dust receiver has a bottom wall section that engages the housing sidewall at a location lower than a lowermost portion of the dust egress arrangement, typically at least 0.25 inch (6.4 mm) lower, usually at least 0.5 inch (12.7 mm) lower.

Selected examples are described herein, in which the dust receiver includes at least a first substantially tangential wall section. A tangential wall section is a wall of the dust receiver that intersects a sidewall of a housing with extension in a direction generally tangentially to a circle drawn around the central axis of the housing and generally corresponding to the housing sidewall. By "generally" or "substantially" tangentially or similar terms in this context, reference is meant to a direction of extension of a wall that is in a plane no more than +/−10° from tangential with respect to the defined circle. Typically, the first tangential sidewall section is one of two opposite, substantially parallel wall sections. In this instance, by the term "substantially parallel" is meant that they are either parallel or extend in planes at +/−10°, inclusive to of one another.

The air cleaner housing can be configured for use with a central axis thereof extending generally horizontally. When this is the case, in at least some instances, the substantially tangential first wall section, and the opposite wall section, will typically comprise top and bottom (or bottom or top) wall sections of the dust receiver. However there is no specific requirement in such instances that the tangential wall section of the dust receiver extend generally horizontally, and thus comprise top and bottom wall sections of a dust receiver. Also, which is top and which is bottom is a function of orientation, and either can serve each purpose.

In some instances, the air cleaner housing is configured for use with a central axis thereof extending generally vertically. When such is the case, in an example assembly described herein, the first substantially tangential wall section and second, opposite, wall section will typically comprise sidewall sections of the dust receiver, which sidewall sections generally extend between top and bottom sections of the dust receiver. Alternatives are possible.

In a typical assembly according to the present disclosure, a filter cartridge is positioned in the air cleaner housing. The filter cartridge will typically comprise media positioned around an open filter interior. The media may define a generally cylindrical outer perimeter definition, although alternatives are possible.

The pulse jet arrangement typically includes a pulse jet tube oriented to direct a cleaning pulse jet into the open filter interior.

In an example assembly described herein, a guide rack support is provided in the housing. The guide rack support is a support on which the cartridge rests, as it is installed. An example guide rack is described, which comprises a loop positioned to be received in the cartridge open filter interior and directed toward an end of the cartridge remote from the pulse jet tube. The support is described as anchored to structural support within the housing. A downwardly directed end to the loop facilities cartridge installation. The guide rack support provides a function of helping the service provider, when the cartridge is long and relatively heavy, maneuver the cartridge into a proper position during installation and removal.

As described herein above, in some instances, the air cleaner assembly includes a compressed gas storage tank (i.e. accumulator tank) secured to the air cleaner housing. In the example depicted, the compressed gas storage tank is positioned in an end of the housing, surrounded by, or at least partially surrounded by, the housing sidewall. It is noted however, the selected features described herein can be applied when there is no accumulator tank secured to the air cleaner assembly.

In an example arrangement described herein, the filter cartridge comprises media positioned in extension between first and second end caps; the first end cap being an open end cap with a central aperture therethrough. In an example described, an axial seal ring is positioned on the first end cap at a location directed away from the media and the second end cap, in a position surrounding (and in the example described spaced from) the central aperture of the first end cap. The axial seal ring is configured and positioned to be removably sealed (axially) against a portion of the housing. In an example depicted, the portion of the housing against which the sealing occurs, is a portion of the compressed gas storage tank (i.e. accumulator tank). It is noted that in an example described the second end cap is generally closed, except for an aperture therethrough that receives a mounting post during mounting the cartridge, and which is sealed closed by appropriate means when the cartridge is mounted. An example of such sealing that is described and depicted is a wing nut with a washer arrangement.

In certain example systems described, and although alternatives are possible, the dust egress aperture arrangement is oriented spaced, radially, upwardly from a lowermost portion of the housing sidewall, in use, by a radial arc of at least 30°. By this it is meant that the dust egress aperture arrangement has a lowermost portion thereof, when the central axis is oriented substantially horizontally, positioned spaced radially around the central axis at least 30° from a lowermost portion of the housing. Typically the spacing is at least 45° from the lowermost portion of the housing, and usually it is at least 75°. Indeed, in some applications it would be spaced at least 90° from a lowermost portion of the housing, leaving the dust egress aperture in the uppermost portion, i.e. the upper half, of the housing.

When the dust egress aperture arrangement comprises a plurality of apertures, herein when reference is made to the radial positioning, it is meant to refer to the radially lowermost portion of a lowermost extending aperture thereof.

In the example assembly depicted, the air cleaner assembly includes an inlet valve/director arrangement comprising a valve member oriented to bias between a first open position and the second closed position. When in the first open position, the inlet valve/director arrangement allows inlet flow through the air flow inlet into the housing, and generally helps direct that flow into the cyclonic pattern. When in the second position, the inlet valve arrangement is positioned to inhibit a pulse flow out the air flow inlet, typically by being biased to close the air flow inlet.

In an example depicted, the inlet valve arrangement comprises a valve member mounted inside the housing and positioned for pivoting of the valve member between the first position and the second position. An example member is depicted, which has a side hingedly connected to an interior of the housing to provide for this movement. The housing may include a support arrangement to help maintain the inlet valve arrangement in a desired orientation.

The dust receiver can be included with a dust ejector valve arrangement positioned over the dust exit aperture; the dust ejector valve arrangement having first and second orientations. The dust ejector valve arrangement, when in the first orientation, closes the dust exit aperture in the dust receiver; and, when in the second orientation opens the dust exit aperture to dust passage therethrough. The dust ejector valve arrangement can include a valve member hingedly mounted on the dust receiver housing.

Typically, the egress aperture arrangement has a total open area of at least 4 sq. in (25.8 sq. cm), typically at least 6 sq. in. (38.7 sq. cm) and often within the range of 6-14 sq. in. (38.7-90.3 sq. cm), although alternatives are possible. (An example would be an aperture area within the range of 6-10 sq. inches (38.7-64.5 sq. cm), inclusive, with a housing having a diameter of 12 inches (30.5 cm)).

Typically, the exit port arrangement in the dust receiver has an overall open area of at least 3 sq. in. (19.4 sq. cm) typically at least 4 sq. in. (25.8 sq. cm) and often within the range of 4-8 sq. (25.8-51.6 sq. cm) in., although alternatives are possible.

Also according to the present disclosure, methods of operating a pulse jet air cleaner assembly, including cleaning a filter cartridge positioned within a housing thereof is provided. In general terms, the method includes steps of:

(a) directing inlet flow of air to be filtered into a housing of the air cleaner assembly in a cyclonic (spiraling or dust rotation) pattern around a filter cartridge positioned therein;

(b) filtering the air by passage of the air through the cartridge in a direction from out-to-in and into an open filter interior;

(c) at a selected time (or condition) directing the pulse jet of air into the open filter interior and through the cartridge from in-to-out; and, (d) directing dust in an interior of the housing through a dust egress arrangement as described and/or into a dust receiver as described.

Directing dust through the dust egress arrangement can be conducted, in part, while the initial entry of air to be filtered is directed into the housing. This is done by causing a portion of the dust to be directed cyclonically around the cartridge, and to be directed through the egress arrangement, for example by an outlet scoop or flange positioned adjacent the egress. This can help dust to pass through the egress arrangement and to settle into a dust receiver positioned exteriorly of the housing. Dust is also directed into the dust receiver, when the pulse jet operation occurs, which also serves to force dust received in the receiver outwardly through an exit port arrangement therein.

Also, herein, some general progressive pulse control logic or methodologies are described. These can be implemented with a pulse jet air cleaner assembly as generally described above, or in alternate pulse jet air cleaner assemblies. In general terms, a cleaning pulse flow through the filter cartridge is directed in a direction generally opposite the filtering flow direction, for example with the step of directing clean pulse flow being conducted in accord with pulse control logic in which:

(a) when a Restriction Condition ($R_c$) reaches a level of at least W, pulsing is conducted for a selected amount $A_2$, when next $R_c$ drops to $Z_2$ or less, for example wherein $Z_2$ is less than W; and, (b) when a Restriction Condition ($R_c$) of at least W is not reached in a selected time period T, pulsing is conducted for a selected amount $A_1$ when next $R_c$ drops to $Z_1$ or less, typically wherein $Z_1$<W. In an example, $A_1$ is less than $A_2$.

The Restriction Condition ($R_c$) can be monitored by monitoring engine RPM and/or monitoring pressure restriction provided by the filter cartridge. Typically, each of the pulsing amounts $A_1$ and $A_2$ will comprise a multiple cleaning pulse event. They can be defined by preselected number of pulses or they can be defined by providing a selected pulse interval (M) between pulses, and providing a pulsing event extending over a selected period of time (N).

In an example methodology described, $Z_1=Z_2$.

Multiple progressive Tiers are described in example pulse control logic approaches herein above. For example, a system generally as characterized above could be implemented with a logic further wherein: when (if) the Restriction Condition ($R_c$) reaches a level of at least X, pulsing is conducted for an amount $A_3$, when Rc next drops to $Z_3$ or less. In an example: $Z_3<X$; $X>W$; $Z_3<W$; and, $A_3<A_2$.

In some instances it may be desirable that once a restriction has reached a sufficiently high amount, pulsing occurs without waiting for a drop in Restriction Condition ($R_c$). For example a system previously characterized can be implemented wherein the pulse control logic further includes providing for that: when (if) the Restriction Condition ($R_c$) reaches a level of at least Y, pulsing is conducted for an amount $A_4$, wherein $Y>X$.

In typical example systems involving pulsing for amount $A_4$ as described, control logic would also include providing that after the pulsing amount $A_4$ occurred, pulsing in accord with the previously defined progressive level would be conducted, for example, pulse an amount $A_3$ when next $R_c$ drops to $Z_3$ or less.

There is no specific requirement that the Restriction Condition ($R_c$) amounts $Z_1$, $Z_2$, $Z_3$ differ from one another.

Pulsing as indicated above will often be defined with respect to the time period over which a pulse event occurs, referenced herein as designator "N" and the time interval between pulses within a pulse event, refereed to herein generally as time interval M. There is no specific requirement that the time interval M between pulses be the same for any of the Tiers or stages of pulsing in a multiple Tier stage system. There is also no requirement that the total time period of the pulse event be the same for each of the Tiers or the stages in a pulse control logic system.

A variety of alternatives are described.

Typically, the selected time interval between pulses will not be greater than 150 seconds, typically not greater than 120 seconds and often not greater than 100 seconds. Indeed, some examples are described in which it is not more than 90 seconds. Also typically the selected time interval between pulses will be at least 15 seconds usually at least 20 seconds. A specific choice of time interval may turn on the size of the compressor in the system.

It is noted that in some instances it may be necessary and appropriate to measure accumulator tank pressure before a pulsing event is initiated, especially when a relatively low power compressor is used. Herein, accumulator tank pressure is sometimes referenced as "ATP."

In another general characterization of techniques according to the present disclosure, a method of operating a pulse jet air cleaner assembly including a cartridge positioned within a housing thereof is provided. The method generally includes a step of selectively directing cleaning pulse flow through the filter cartridge and in a direction generally opposite to a filtering flow direction; the step of directing cleaning pulse flow being generally in accord with a pulse control logic including at least three (3) pulse event initiation and protocol type including:

(1) A base type wherein pulsing is instantiated for a selected $A_1$ if a restriction condition ($R_c$) does not reach a defined level W, within a selected time period T;

(2) At least one intermediate type, wherein pulsing is initiated for a selected amount $A_2$ after the restriction condition ($R_c$) is observed to reach the defined level W, but only after the restriction condition ($R_c$) next reduces to no more than a selected level, which is typically less than W; and, (3) A priority type, wherein pulsing is initiated for a selected amount $A_4$ when the restriction condition ($R_c$) is observed to reach a level Y, without waiting for a reduced restriction condition ($R_c$) relative to Y, to next occur; wherein Y is greater than W.

Of course the at least one intermediate type can include more than one level. For example, the at least one intermediate type pulse event protocol can be one having:

(a) a first level, wherein pulsing is initiated for a selected amount $A_2$ after: the restriction condition ($R_c$) is observed to reach a level W but not a level X, wherein X is greater than W, but only after the restriction condition ($R_c$) next reduces to no more than a selected level which is less than W; and, (b) A second level wherein pulsing is initiated for a selected amount $A_3$ after: the restriction condition ($R_c$) is observed to reach a level X but not a level Y, but only after the restriction condition ($R_c$) next reduces to no more than a selected level which is less than W.

Typically, the restriction condition ($R_c$) corresponding to W is at least 14 inches (356 mm) of $H_2O$. Typically, the restriction condition ($R_c$) Y is at least 3 inches (76.2 mm) of $H_2O$) greater than the restriction condition ($R_c$) W. Typically, the restriction condition ($R_c$) corresponding to X: is at least one inch (25.4 mm) of $H_2O$ greater than the restriction condition ($R_c$) corresponding to W; and, at least one inch (25.4 mm) of $H_2O$ less than the restriction condition ($R_c$) corresponding to Y.

Typically, the restriction condition ($R_c$) at or below which the restriction condition ($R_c$) must go, in the intermediate protocol type, for initiating a pulsing event after having reached a level W is at least 8 inches (203 mm) of $H_2O$ lower than W. Typically that level is at least 10 inches (254 mm) of $H_2O$ lower than W. Often the level below which the restriction condition ($R_c$) must go, for the base type of the intermediate type pulsing event to be initiated, is no more greater than 7.5 inches (191 mm) of $H_2O$ and typically no greater than 7 inches (178 mm) of $H_2O$. In some instances it is no greater than 5.5 inches (14 cm) of $H_2O$.

In a typical process, the amount $A_1$ is less than the amount $A_2$. Indeed, typically $A_2$ is at least 1.5 times $A_1$. Also, typically the amount $A_4$ is greater than $A_1$, usually $A_4$ is at least two times the amount $A_1$.

Of course in accord with the present disclosure an air cleaner assembly is provided which includes an air cleaner housing having an air flow inlet; an air flow outlet and an interior and a dust ejection port arrangement. A filter cartridge is positioned within the housing interior and the pulse jet arrangement is provided configured to direct the cleaning pulse flow through the filter cartridge. The pulse jet arrangement includes a logic protocol program to provide pulsing in accord with the descriptions herein above.

There is no requirement that an assembly or method include all of the features and techniques described herein, in order to obtain some benefit according to the present disclosure.

What is claimed:

1. A method of operating a pulse jet air cleaner assembly for filtering intake air to an internal combustion engine and including a cartridge positioned within a housing thereof; the method including steps of:

(a) directing inlet flow of air to be filtered into a housing of the air cleaner assembly;
(b) filtering the air by passage through the filter cartridge in a filtering flow direction; and,
(c) selectively directing cleaning pulse flow through the filter cartridge in a direction generally opposite the filtering flow direction; the step of directing cleaning pulse flow being in accord with a pulse control logic in which:
  when a restriction condition $R_c$ reaches a level of at least W, Tier 1 pulsing is conducted for a selected amount $A_2$, when next $R_c$ drops to $Z_2$ or less, wherein $Z_2<W$;
  (ii) when a restriction condition $R_c$ of at least W is not reached within a selected time period T, Tier 0 pulsing is conducted for a selected amount $A_1$, when next $R_c$ drops to $Z_1$ or less; and;
  (iii) if the restriction condition $R_c$ reaches a level of at least X, where X>W, without pulsing in accord with Tier 0 and Tier 1, since condition X was reached, Tier 2 pulsing is conducted for an amount $A_3$, when next $R_c$ drops to $Z_3$ or less, wherein: $Z_3<X$; X>W; and, $Z_3<W$.

2. A method according to claim 1 wherein:
(a) the pulsing amounts $A_1$, $A_2$ and $A_3$ each comprise multiple cleaning pulses.

3. A method according to claim 2 wherein:
(a) $A_1<A_2$.

4. A method according to claim 3 wherein:
(a) $A_3>A_2$.

5. A method according to claim 1 wherein:
(a) $Z_1=Z_2$.

6. A method according to claim 1 wherein:
(a) the selected amount $A_1$ comprises pulsing for a selected pulse event time period $N_1$.

7. A method according to claim 6 wherein:
(a) the selected amount $A_2$ comprises pulsing for a selected pulse event time period $N_2$, wherein $N_2>N_1$.

8. A method according to claim 7 wherein:
(a) the selected amount $A_3$ comprises pulsing for a selected pulse event time period $N_3$, wherein $N_1<N_3$.

9. A method according to claim 1 wherein:
(a) the selected amount $A_1$ comprises pulsing with a selected time interval $M_1$ between pulses;
(b) the selected amount $A_2$ comprises pulsing with a selected time interval $M_2$ between pulses; and,
(c) the selected amount $A_3$ comprises pulsing with a selected time interval $M_3$ between pulses.

10. A method according to claim 9 wherein:
(a) the selected time period $M_1$ is no greater than 120 sec.

11. A method according to claim 9 wherein:
(a) the selected time period $M_1$ is at least 15 sec.

12. A method according to claim 1 wherein:
(a) the restriction condition $R_c$ is evaluated by monitoring engine RPM.

13. A method according to claim 1 wherein:
(a) the method includes a step of checking an accumulator tank pressure before pulsing; and,
(b) the pulsing is only conducted if the accumulator tank pressure (ATP) is above a selected amount.

14. A method according to claim 1 wherein:
(a) the cleaning pulse flow is conducted in accord with a pulse control logic further wherein:
  (i) when the restriction condition $R_c$ reaches a level of at least Y, pulsing is conducted for an amount $A_4$, wherein Y>X.

15. A method according to claim 14 wherein:
(a) after pulsing is conducted for an amount $A_4$, pulsing is conducted for an amount $A_3$, when next $R_c$ drops to $Z_3$ or less.

* * * * *